United States Patent [19]

Matsuda et al.

[11] Patent Number: 5,485,435
[45] Date of Patent: Jan. 16, 1996

[54] MAGNETIC FIELD GENERATOR IN WHICH AN END FACE OF A MAGNETIC MATERIAL MEMBER PROJECTS FROM MAN END FACE OF MAGNETIC FIELD GENERATING CORES

[75] Inventors: Toru Matsuda, Yokohama; Fujihiro Ito, Saitama; Yutaka Kusano; Kenji Makino, both of Yokohama; Koyo Hasegawa, Tokyo, all of Japan

[73] Assignee: Canon Kabushiki Kaisha, Tokyo, Japan

[21] Appl. No.: 331,148

[22] Filed: Oct. 28, 1994

Related U.S. Application Data

[63] Continuation of Ser. No. 749,729, Aug. 26, 1991, abandoned.

[30] Foreign Application Priority Data

| Mar. 20, 1990 | [JP] | Japan | 3-080647 |
| Jul. 10, 1991 | [JP] | Japan | 3-195062 |
| Aug. 29, 1990 | [JP] | Japan | 2-225083 |
| Aug. 31, 1990 | [JP] | Japan | 2-228049 |

[51] Int. Cl.$^6$ ................................... G11B 13/04
[52] U.S. Cl. .......................... 369/13; 360/114; 360/103; 360/124
[58] Field of Search ................... 369/13; 360/59, 360/114, 66, 60, 103, 124

[56] References Cited

U.S. PATENT DOCUMENTS

| 4,369,476 | 1/1983 | Karsh | 360/124 |
| 4,706,232 | 11/1987 | Funada et al. | 369/13 |
| 4,750,159 | 6/1988 | Yoda | 369/13 |
| 5,043,960 | 8/1991 | Nakao et al. | 369/13 |
| 5,103,351 | 4/1992 | Kazama et al. | 360/114 |

FOREIGN PATENT DOCUMENTS

| 0110513 | 6/1984 | European Pat. Off. |
| 62-022205 | 1/1987 | Japan | 360/124 |
| 62-80810 | 4/1987 | Japan | 360/114 |
| 62-110646 | 5/1987 | Japan | 360/114 |
| 62-97116 | 5/1987 | Japan | 360/124 |
| 63-0237241 | 10/1988 | Japan . |
| 010013203 | 1/1989 | Japan . |
| 64-0001102 | 1/1989 | Japan . |
| 010092942 | 4/1989 | Japan . |
| 1-173408 | 7/1989 | Japan | 369/13 |

OTHER PUBLICATIONS

Patent Abstracts of Japan, Kokai No. 01–245540, vol. 13, No. 583, Dec. 1989.

*Primary Examiner*—Hoa T. Nguyen
*Attorney, Agent, or Firm*—Fitzpatrick, Cella, Harper & Scinto

[57] ABSTRACT

A magnetic field generator includes a base, a plurality of magnetic field generating cores formed on the base, magnetic field generating coils respectively wound around the plurality of magnetic field generating cores, a magnetic material member being disposed between adjacent twos of the plurality of magnetic field generating cores, and a drive device for driving the magnetic field generating coils. Also, a magneto-optical recording apparatus includes an optical head for irradiating a light beam to a magneto-optical recording medium and the magnetic field generator. The magnetic field generator can set the maximum modulation frequency at a higher value while ensuring a scope of the effective vertical magnetic field sufficiently and efficiently, to thereby permit multi-recording.

26 Claims, 29 Drawing Sheets

F I G. 12
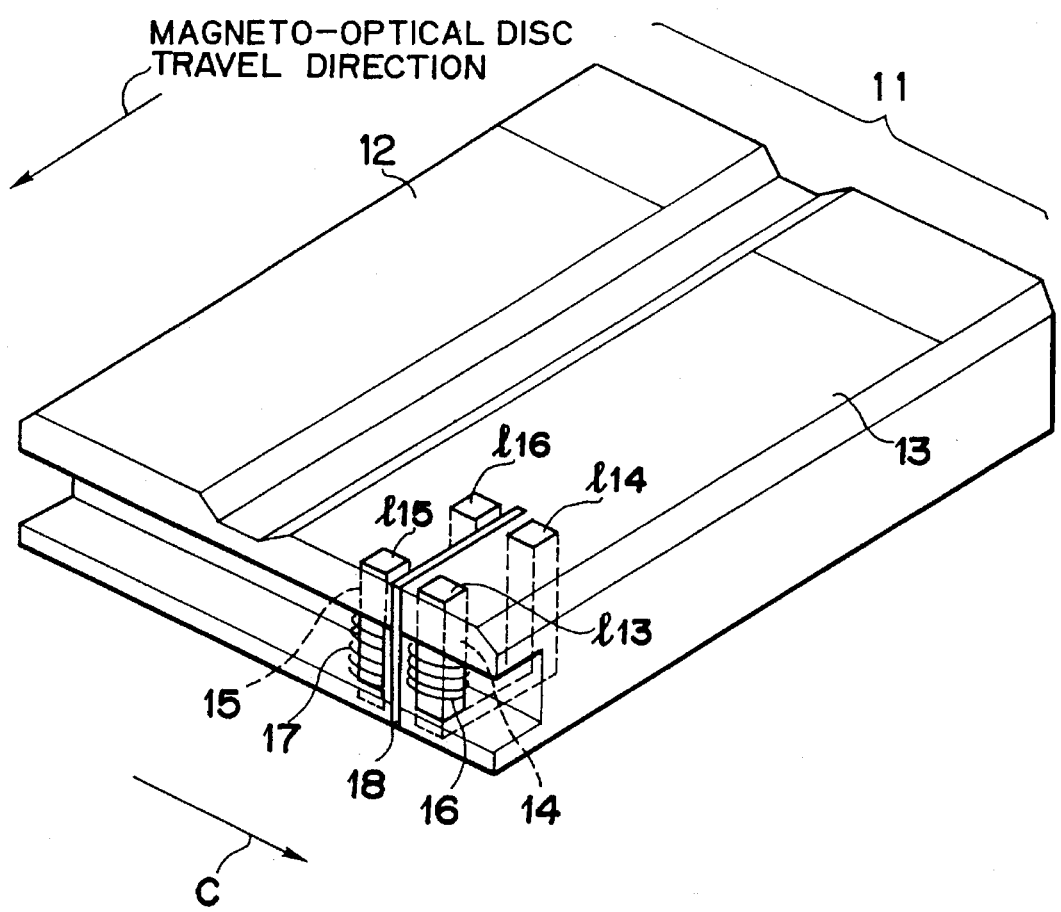

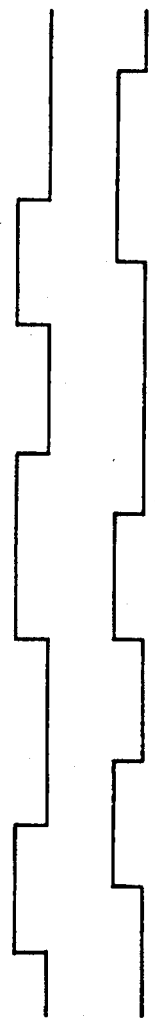
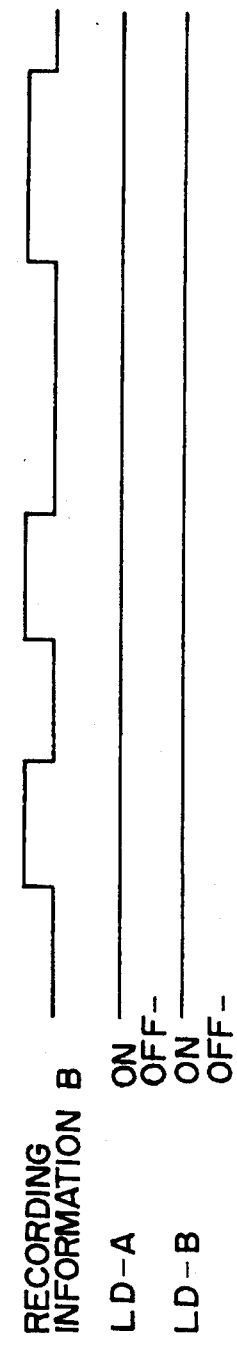
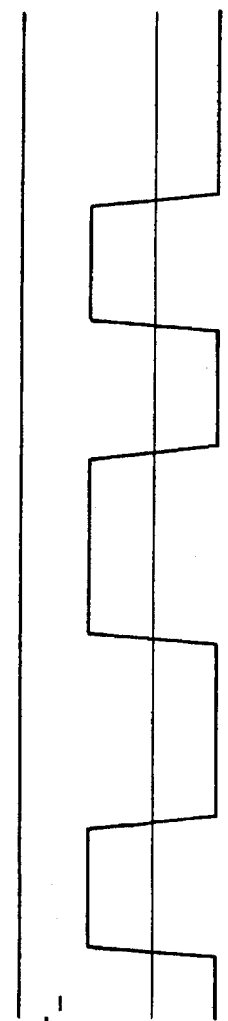
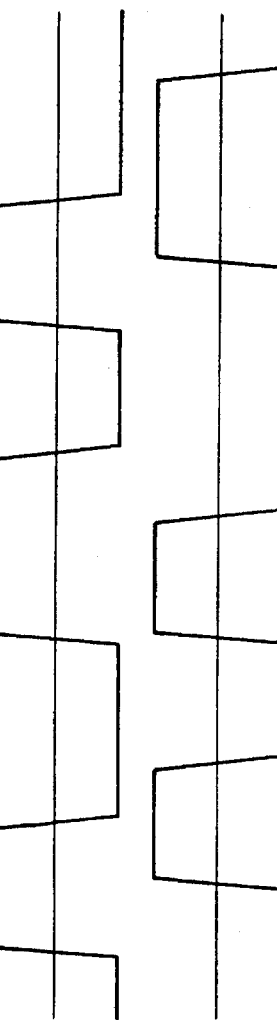
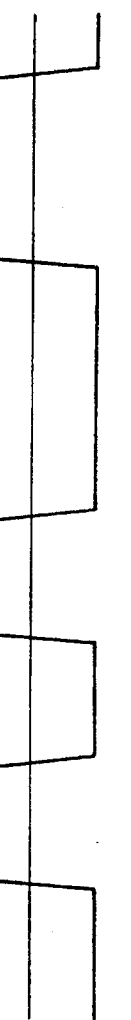
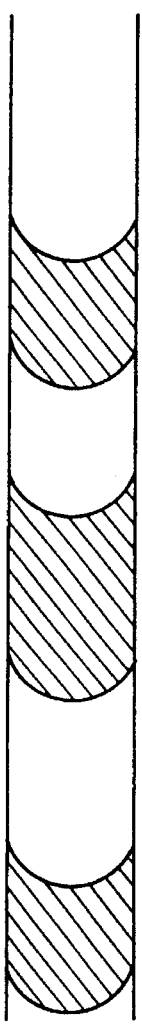
FIG. 16A RECORDING INFORMATION A
FIG. 16B RECORDING INFORMATION B
FIG. 16C LD-A ON OFF
FIG. 16D LD-B ON OFF
FIG. 16E INTENSITY OF MAGNETIC FIELD AT FOCAL POINT 64
FIG. 16F INTENSITY OF MAGNETIC FIELD AT FOCAL POINT 61
FIG. 16G RECORDING MAGNETIC DOMAIN PATTERN A
FIG. 16H RECORDING MAGNETIC DOMAIN PATTERN B F I G. 18
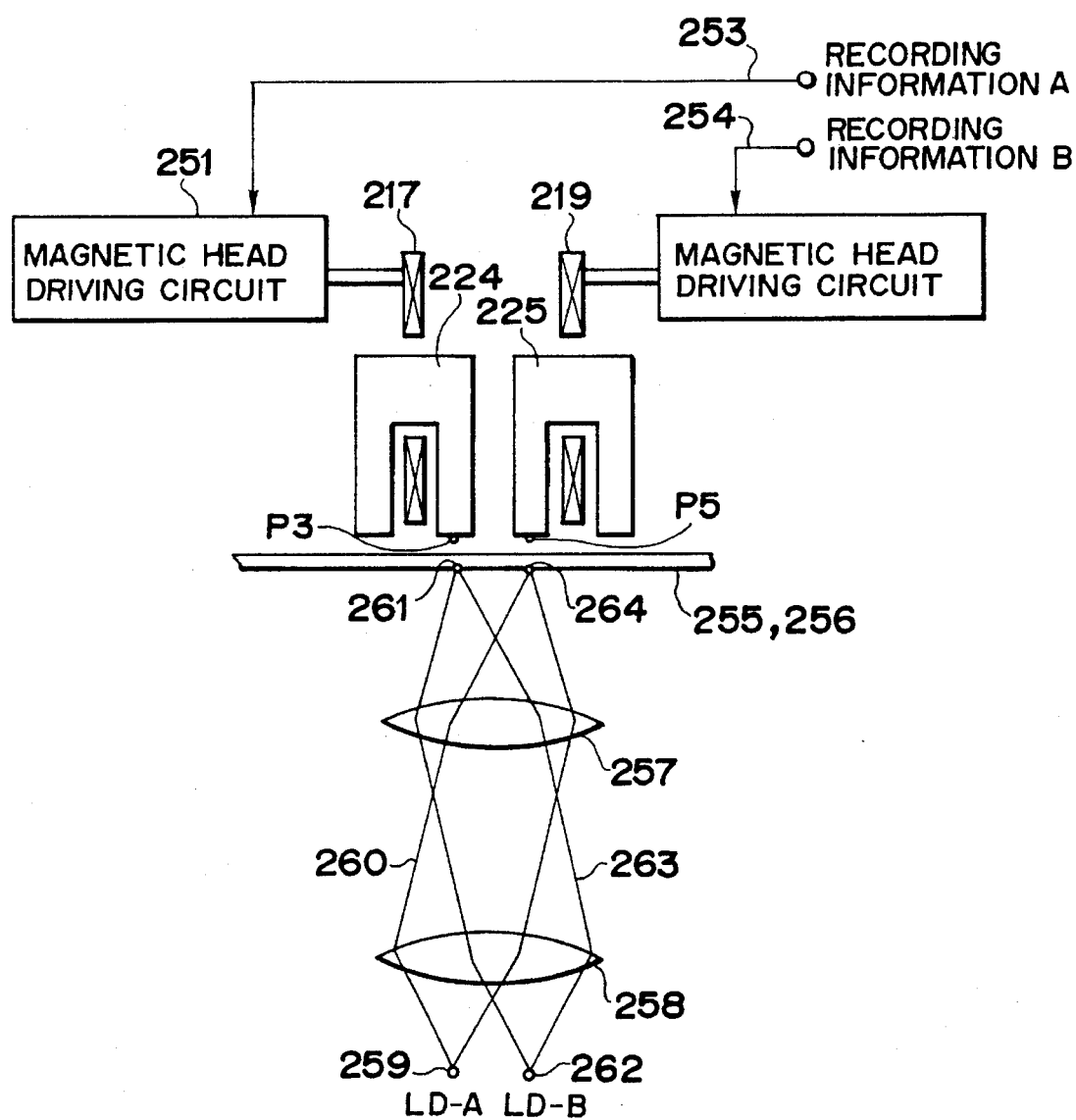

FIG. 20
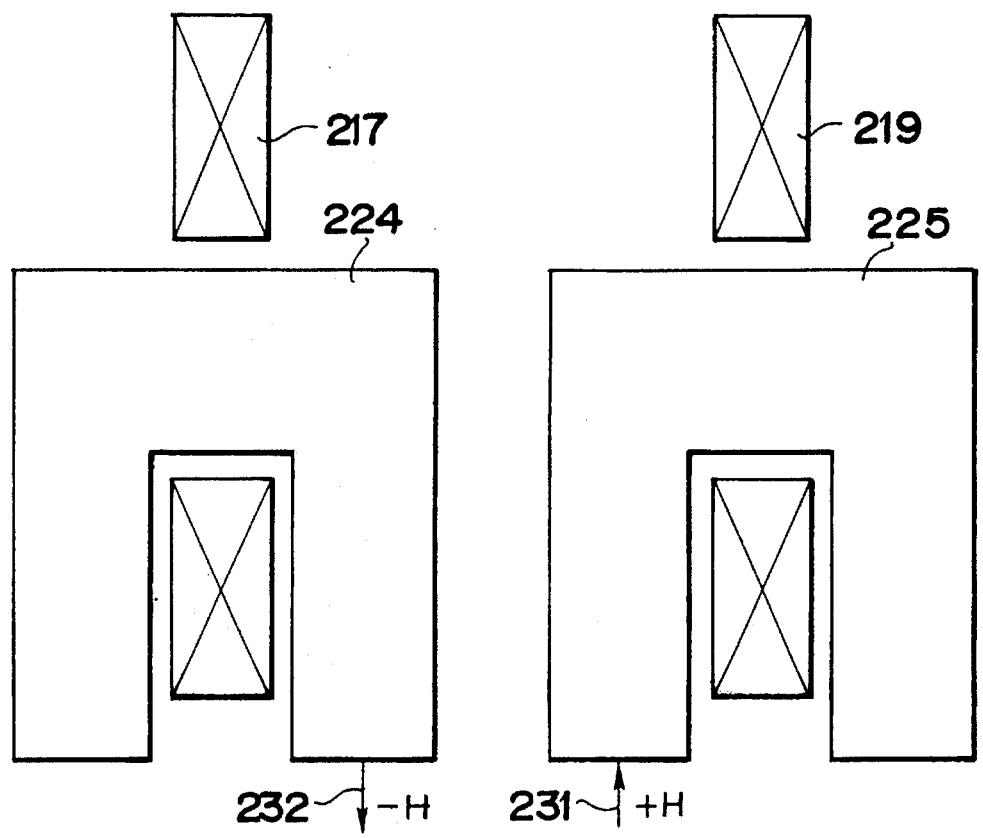
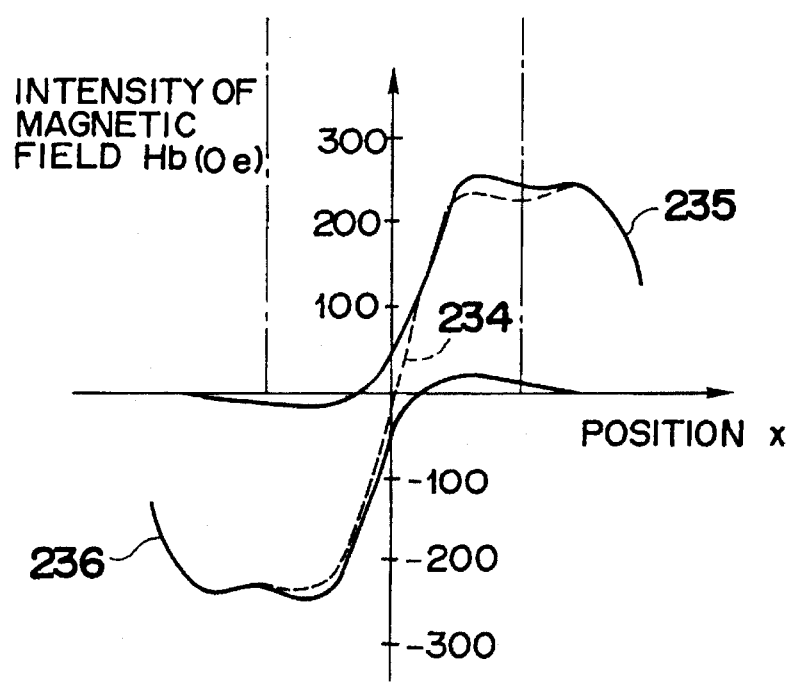

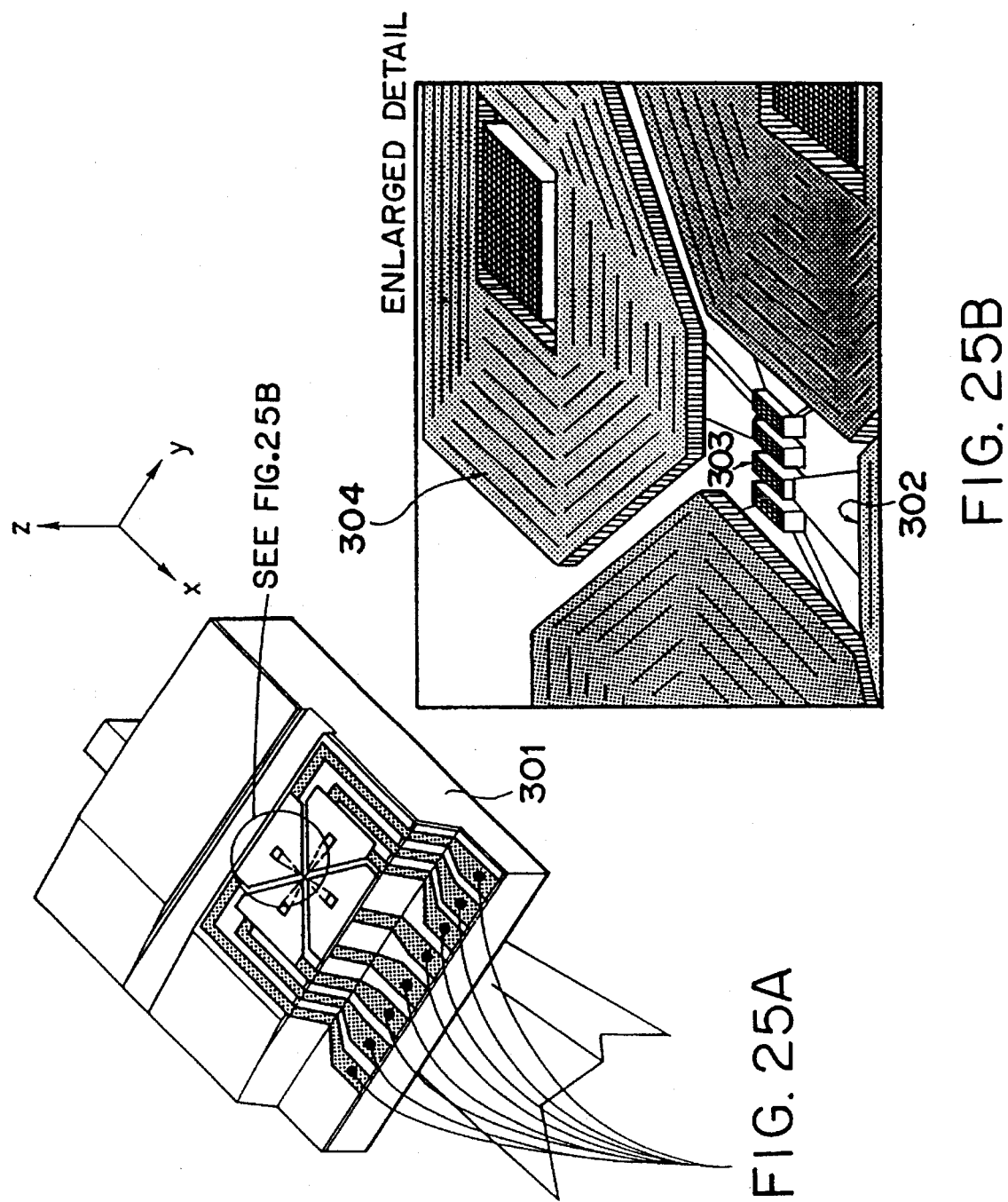

MAGNETIC FIELD GENERATOR IN WHICH AN END FACE OF A MAGNETIC MATERIAL MEMBER PROJECTS FROM MAN END FACE OF MAGNETIC FIELD GENERATING CORES

This application is a continuation of prior application, Ser. No. 07/749,729, filed Aug. 26, 1991, now abandoned.

BACKGROUND OF THE INVENTION

1. Field of the Invention

The present invention relates to a magnetic field generator of a magneto-optical recording apparatus in which information is magneto-optically recorded and erased by irradiating a laser beam to a magneto-optical recording medium from one side and applying a magnetic field thereto from the opposite side.

2. Related Background Art

When information is recorded and erased in that type of magneto-optical recording apparatus, an optical head is used to irradiate a laser beam emitted from a semiconductor laser to a magneto-optical recording medium in the form of a disc, for example, and the external magnetic field is also applied to the magneto-optical recording medium vertically at the same position as that being irradiated. The magnetic field generator is of the floating type as shown in FIG. 1, for example, and is disposed above the disc-like magneto-optical recording medium in opposite relation to the underlying optical head (not shown). A slider 81 for producing a floating force is made of non-magnetic material and has two slide surfaces 82, 83 on both sides of a center groove. A core 84 for generating the vertical magnetic field is buried in an air outflow portion (i.e., a portion from which airflow in the direction of travel of the magneto-optical recording medium is discharged) of one slide surface. A winding window 85 is defined by forming a cutout in the rear end portion of the slider 81, and a coil 86 is wound around the core 84 through the winding window 85. As a result, a magnetic path is made open outwardly at the end of the core 84 with magnetic poles $l_1$ and $l_2$ arranged in the surface of the slider 81 facing the magneto-optical recording medium (denoted by reference numeral 93 in FIG. 2). Then, as well known, the coil is supplied with a signal voltage to apply the vertical magnetic field to a recording layer (denoted by 94 in FIG. 2) of the magneto-optical recording medium.

On the other hand, as shown in FIG. 2, a light beam 91 from a semiconductor laser is focused through an object lens 92 to a focal point S on the recording layer 92. At this time, the core 84 is positioned on the opposite side of the magneto-optical recording medium 93 in facing relation to the object lens 92 so that the vertical magnetic field is applied from the magnetic pole $l_1$ to the recording layer 94. Usually, the focal point S is moved on the order of about ± 250 μ m in the radial direction of the magneto-optical recording medium (for so-called tracking) by movement of the object lens 92 in tracking control without moving the optical head, and the magnetic pole $l_1$ of the core 84 is set such that its effective vertical magnetic field has the width size to substantially cover a movable scope of the focal point.

Further, for the purpose of efficient generation of the magnetic field, the core 84 is in the form of a horseshoe or U to make the magnetic path open outwardly. As seen from FIG. 1, the magnetic pole $l_2$ for generating the magnetic field of opposite magnetism to the magnetic pole $l_1$ is also exposed to the slide surface 83. To secure a sufficient area of the winding window 85, the spacing between the magnetic poles $l_1$ and $l_2$ is relatively wide, on the order of several hundreds of microns.

Considering an alignment error between the core 84 and the object lens 92 as well, however, the core 84 is required to have a width of about ± 300 μ m in the radial direction of the magneto-optical disc (i.e., in a direction orthogonal to the direction of a track thereof) and a length of about ±100 μ m in the direction of a track. On the other hand, the relationship between a scope of the effective vertical magnetic field generated by the core and maximum modulation frequency of the magnetic head at that time is in inverse proportion as plotted in FIG. 3. Stated otherwise, since the effective magnetic field scope of the magnetic head corresponds to a sectional area of the core magnetic pole, the effective magnetic field scope is substantially in match with the sectional area of the magnetic pole $l_1$ of 0.6 mm×0.2 mm= 0.12 mm$^2$ and, therefore, the maximum modulation frequency is about 2.5 MHz.

Meanwhile, requirements for characteristics of the magneto-optic recording apparatus are increased year by year to be adapted for speed-up. It is naturally desired to set the higher maximum modulation frequency and, as a result, the foregoing 2.5 MHz is insufficient. Also, since the spacing between the two magnetic poles $l_1$ and $l_2$ is wide, as large as about 100 μ m, the magnetic resistance for forming the magnetic path between those two magnetic poles is too high to generate the vertical magnetic field efficiently and sufficiently.

It has, therefore, been proposed to reduce the size of a core in a magnetic head and arrange the small-size core plural in number. More specifically, as shown in FIG. 4, the proposed construction includes a pair of small-size cores 111, 113 around which coils 112, 114 are respectively wound to be driven independently of each other. As compared with the aforementioned case of using a single core, the required scope of the effective vertical magnetic field can be reduced by almost half and the maximum modulation frequency can be increased almost twice in the case of using the two cores 111 and 113. However, this case also has other problems explained below.

Specifically, in a graph on the lower side of FIG. 4, a solid line 117 represents the intensity of the magnetic field versus a horizontal position x spaced several tens of microns from the lower end face of the core 111 when a winding 112 coiled around the core 111 is supplied with an electric current to generate the upward magnetic field + H (indicated by an arrow 115). As will be seen from FIG. 2, as the position x is further apart away from the core end face, the magnetic field generated becomes weak to such an extent that it is smaller at a middle position between the core 111 and the adjacent core 113 than the vertical magnetic field of 200 [Oe] necessary for recording of information to a recording medium. Accordingly, to obtain the required magnetic field at the middle point between the two cores 111 and 113, the electric current supplied to the coil must be increased, which is disadvantageous in driving at high frequency. This will offset the benefit of increasing the modulation frequency due to a reduction in size of the cores.

Furthermore, when carrying out multi-beam recording to meet the requirement of speed-up of the magneto-optical recording apparatus, the modulation magnetic fields to be modulated in accordance with recording information are required to be applied independently of each other in irradiating a plurality of light beams to a magneto-optical recording medium for formation of spots at predetermined positions. Here, a coil 114 wound around the core 113 is supplied with an electric current in such a manner as to generate the magnetic field in an opposite direction to that generated by the coil 112 wound around the core At this time, the core 113 generates the downward magnetic field −H (indicated by an arrow 116) and, similarly to the above case, the intensity of the magnetic field versus the horizontal position x is represented by a solid line 118. The vertical magnetic field actually applied to the recording medium from the magnetic fields 117, 118 respectively generated by the two cores 111, 113 is represented by a dotted line 119. As a result, even at central positions $x_{111}$, $x_{113}$ of the cores 111, 113 with respect to the recording medium, the vertical magnetic field higher than $\pm 200$ [Oe] necessary for recording cannot be obtained so that the multi-beam recording fails to perform. Spacing the two cores farther away from each other so as to avoid an influence of mutual interference therebetween, however, means larger separation between the plural light beams in a single optical head. This is difficult and infeasible to carry out from the practical standpoint.

SUMMARY OF THE INVENTION

The present invention has been made in view of the above-mentioned situations in the art, and is to provide a modulation magnetic field generator which can set the maximum modulation frequency at a higher value while ensuring a scope of the effective vertical magnetic field sufficiently and efficiently, and which has a high transfer rate enough to permit multi-recording in the magnetic field modulation recording.

For that purpose, according to the present invention, there is provided a magneto-optical recording apparatus of the type that light from a semiconductor laser is irradiated to a magneto-optical recording medium on one side from an optical head, and magnetic fields are generated by a plurality of magnetic field generators from the opposite side of the magneto-optical recording medium, thereby recording and erasing information, wherein the light from the optical head is irradiated in the form of plural beams to the magneto-optical recording medium, cores of the magnetic field generators are arranged in plurally divided fashion, a coil for generating a modulation magnetic field is wound around each core, and a member made of magnetic material is disposed between adjacent twos of the cores.

By decreasing the scope of the effective vertical magnetic field generated by a magnetic pole of the single magnetic field generating core, it is possible to reduce a sectional area of the magnetic pole to set a higher maximum frequency which can be modulated. It is also possible to perfectly eliminate influences of the magnetic fields generated by the adjacent magnetic field generating cores, so that the respective magnetic field generating cores can be driven in a completely independent manner and multi-recording is enabled with the single optical head.

BRIEF DESCRIPTION OF THE DRAWINGS

FIG. 12 is a perspective view showing another embodiment of the magnetic head for use in the magneto-optical recording apparatus of the present invention, FIGS. 16A to 16H are a set of timing charts showing recording signals, magnetic fields and magnetic domain patterns, FIG. 18 is a view showing a construction of surroundings of a magnetic field generator in the embodiment of FIG. 17, FIG. 20 is a diagram for explaining distribution of the magnetic field generated in the embodiment of FIG. 17, FIGS. 21A to 21C are views showing another embodiment of the slider of the magnetic head for use in the magneto-optical recording apparatus of the present invention, FIGS. 25A and 25B are a perspective view, and a partial enlarged detail, respectively, of the slider of the magnetic head for use in the magneto-optical recording apparatus of the present invention.

DESCRIPTION OF THE PREFERRED EMBODIMENTS

Figure 1:
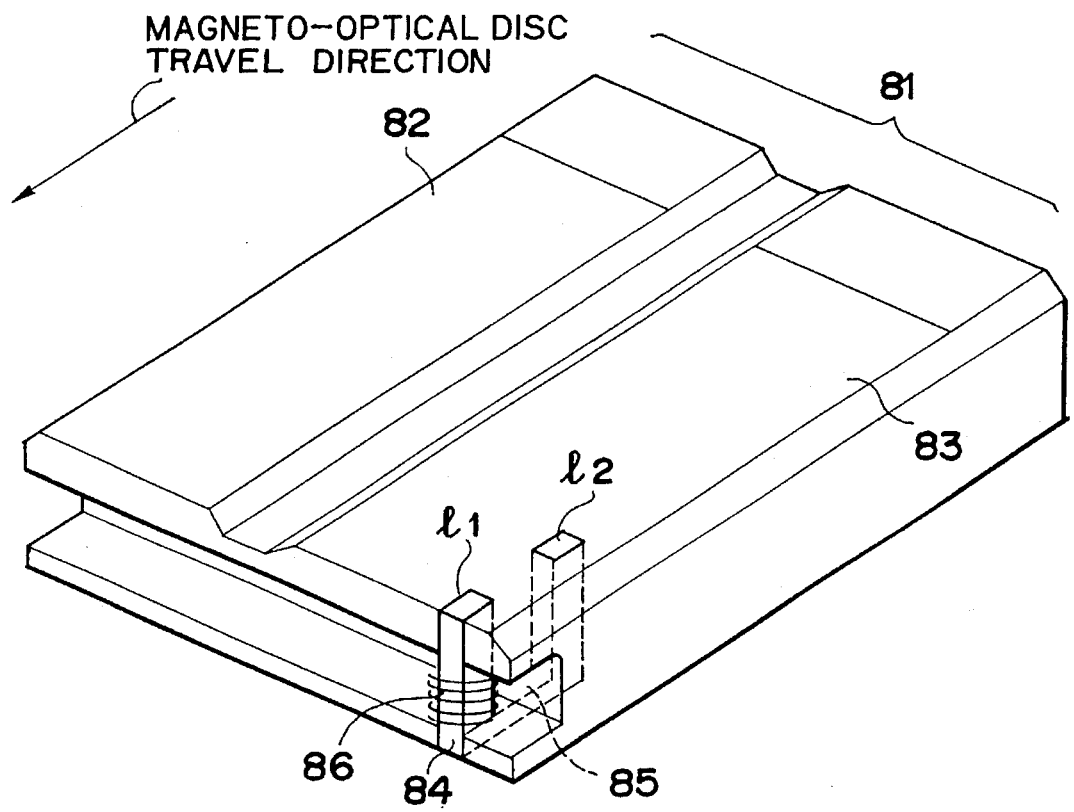
FIG. 1 is a perspective view showing a conventional magnetic field generator.

Hereinafter, one embodiment of a magnetic head for use in the magneto-optical recording apparatus of the present invention will be described in detail with reference to FIGS. 5 to 11. In these drawings, reference numeral 1 denotes a slider (base) of the magnetic head which is made of non-magnetic material. Two slide surfaces 2, 3 are formed in facing relation to airflow produced by rotation of a magneto-optical recording medium in the form of a disc, for example. Cores 4, 5 for generating modulation magnetic fields are built in either one of the slide surfaces 2, 3, e.g., in the slide surface 3. Winding coils 6, 7 are respectively wound around the cores 4, 5 to flow drive currents therethrough. The cores 4, 5 are arranged in the direction of travel of the magneto-optical disc as a recording medium. The direction of arrow C in FIG. 5 indicates the radial direction of the magneto-optical disc (i.e., a direction orthogonal to the direction of a track thereof) in which direction an optical head is subjected to tracking control. Further, the direction of travel of the magneto-optical disc corresponds to the direction of a track of the recording medium. Nearly at the middle position between the cores 4 and 5, there is placed a magnetic member 8 made of soft magnetic material and having a sectional area equal to or greater than a projected area of the surface of each core which is substantially orthogonal to the direction of travel of the recording medium.

The material of the magnetic member 8 desirably has sufficiently high permeability for a high frequency magnetic field. One example of such materials is Mn—Zn ferrite.

The cores 4, 5 respectively have magnetic poles $l_3$, $l_4$ and $l_5$, $l_6$ exposed perpendicularly to the slide surface 3. The magnetic poles $l_3$ and $l_5$ are used to apply a vertical magnetic field to the recording medium.

Figure 6A:
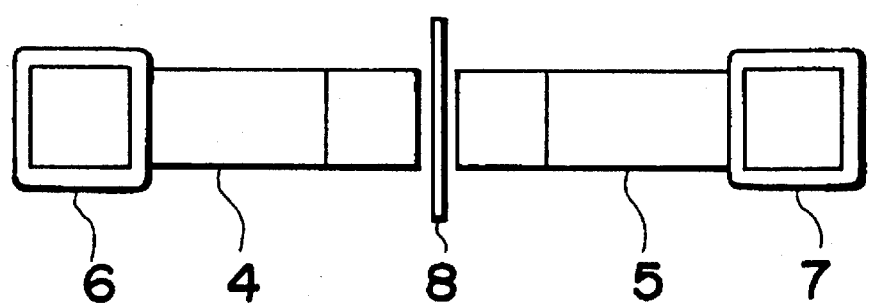
FIGS. 6A and 6B are a plan and front view of a primary portion of the magnetic head, respectively.
Figure 6B:
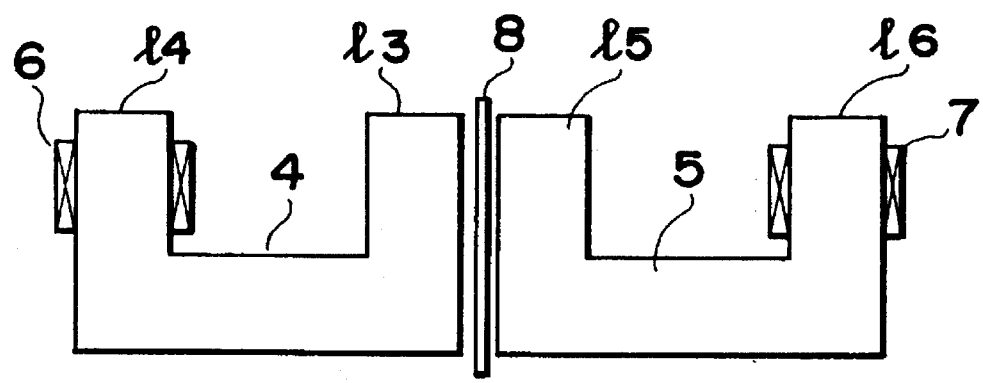

FIGS. 6A and 6B show an arrangement and construction of only the cores 4, 5, the coils 6, 7 and the magnetic member 8. The magnetic member 8 is disposed between the cores 4 and 5 not in contact therewith, and has a sectional area almost equal to or greater than an area of each core projected in the direction of travel of the recording medium in FIG. 5.

Figure 9:
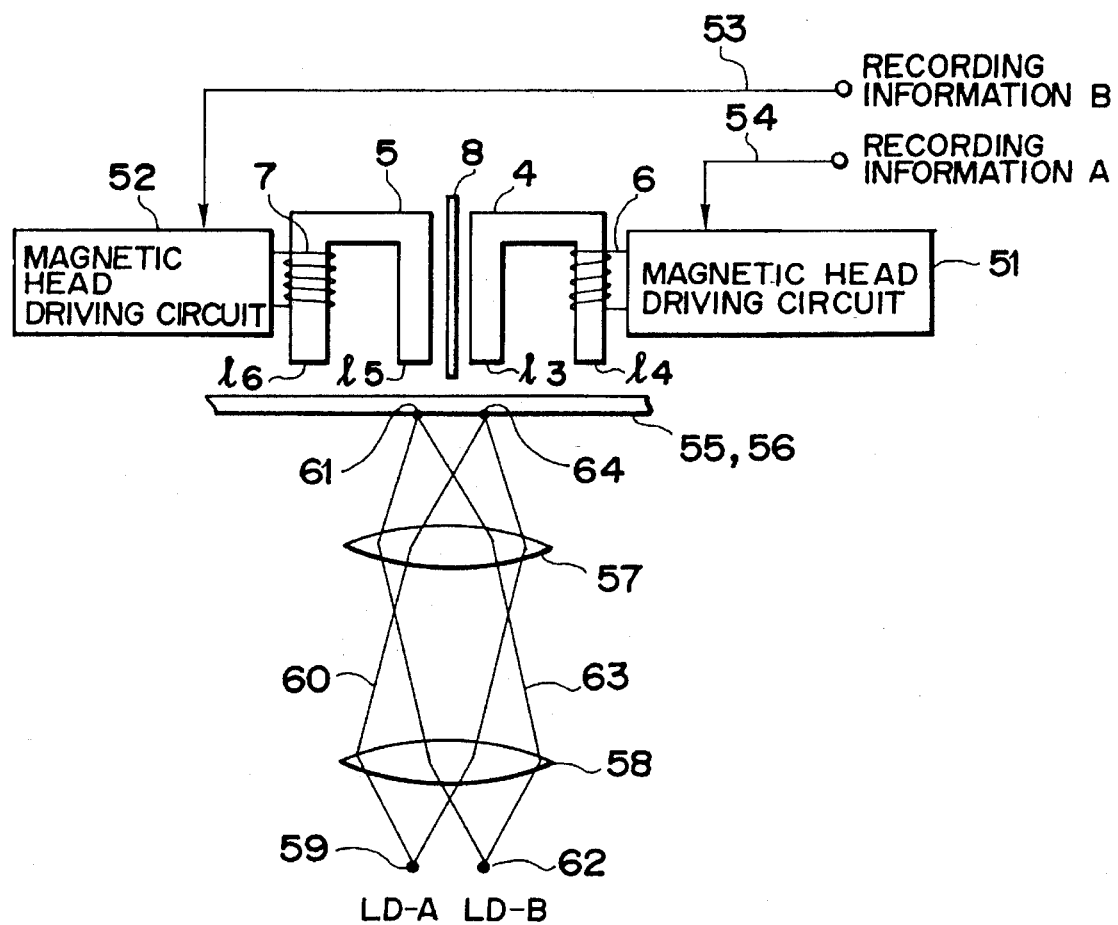
FIG. 9 is a view showing a relevant construction under a state of magneto-optical recording.

Then, as shown in FIG. 9, corresponding to scopes of the effective vertical magnetic fields generated by the cores 4, 5 around the magnetic poles $l_3$, $l_5$, an object lens 57 is disposed in the optical head on the opposite side of a recording medium (i.e., magneto-optical disc) 56 to the magnetic head, the object lens 57 being movable in the radial direction. For multi-recording, light beams 60, 63 emitted from semiconductor lasers (LD-A) 59 and (LD-B) 62 are focused by the object lens 57 onto a magneto-optical recording layer 55 in the magneto-optical disc at respective focal points 61, 64. The laser beam sources may be a multi-emission laser device constructed on the same chip, or may be two separate laser devices as long as they are optically identical to each other. While emission points of the semiconductor lasers 59, 62 are spaced on the order of about 100 μm from limitations in manufacture of the lasers, the light beams 60, 63 emitted from the lasers 59, 62 are converted by a collimator lens 58 into parallel beams and then focused by the object lens 57 onto the recording layer, as mentioned above, with a proper spacing between the focal points.

The coil 6 is driven by a magnetic head driving circuit 51 to generate a magnetic field with polarity dependent on recording information (A) 54, so that the vertical magnetic field dependent on the recording information 54 is applied from the magnetic pole $l_3$ to the focal point 64. Likewise, the coil 7 is driven by a magnetic head driving circuit 52 to generate a magnetic field with polarity dependent on recording information (B) 53, so that the vertical magnetic field dependent on the recording information 53 is applied from the magnetic pole $l_5$ to the focal point 61.

Figure 10:
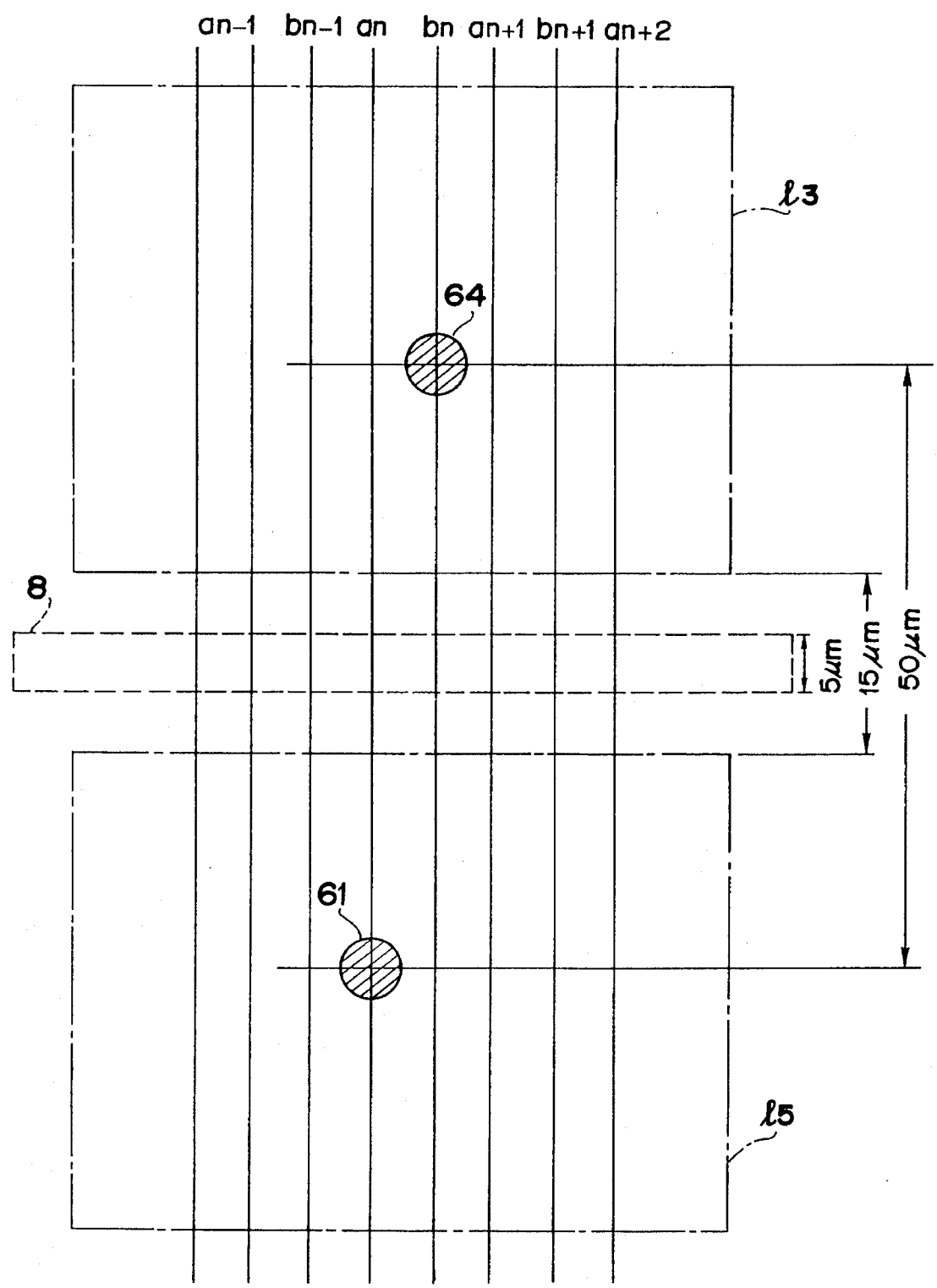
FIG. 10 is a diagram showing the relationship in relative position between a focal point and the magnetic head.

When the two light beams irradiated from the optical head in the magneto-optical recording apparatus of the present invention are focused on the recording layer at the two focal points as stated above, the relationship in relative position between the focal points and the magnetic head as viewed from the optical head side is illustrated in FIG. 10. Here, the focal points 61, 64 are in positions respectively corresponding to the track numbers n and n+1 which are spaced on the order of about 50 μm from each other. In this embodiment, two tracks a, b are spirally formed on the recording medium independently of each other. Assuming now that the focal points 61, 64 are positioned on tracks $a_n$, $b_n$, therefore, after the recording medium makes a turn, the focal points shift to next tracks $a_{n+1}$, $b_{n+1}$, respectively. Note that the recording medium used may be other than one having two independent tracks. In the case of a usual recording medium having a single spiral track, one track jump may be performed for each rotation of the recording medium. To put it in more detail, with such an arrangement that the focal point 61 is shifted to the track $b_n$ and then to the track $a_{n+1}$ by the track jump after the recording medium makes a turn, there is no fear of erasing the information recorded on the track $b_n$ by the focal point 64.

The magnetic head is positioned on the opposite side to the optical head with the recording medium therebetween. The focal points 61, 64 are magnetically shielded from each other by the magnetic member 8 substantially at the middle point between the magnetic poles $l_3$ and $l_5$ of the magnetic head. From the standpoints of accuracy and easiness in manufacture of the magnetic head, it is preferable that the magnetic member 8 has a thickness of 5 μ m and the spacing between $l_3$ and $l_5$ is on the order of 15 μ m.

Figure 7:
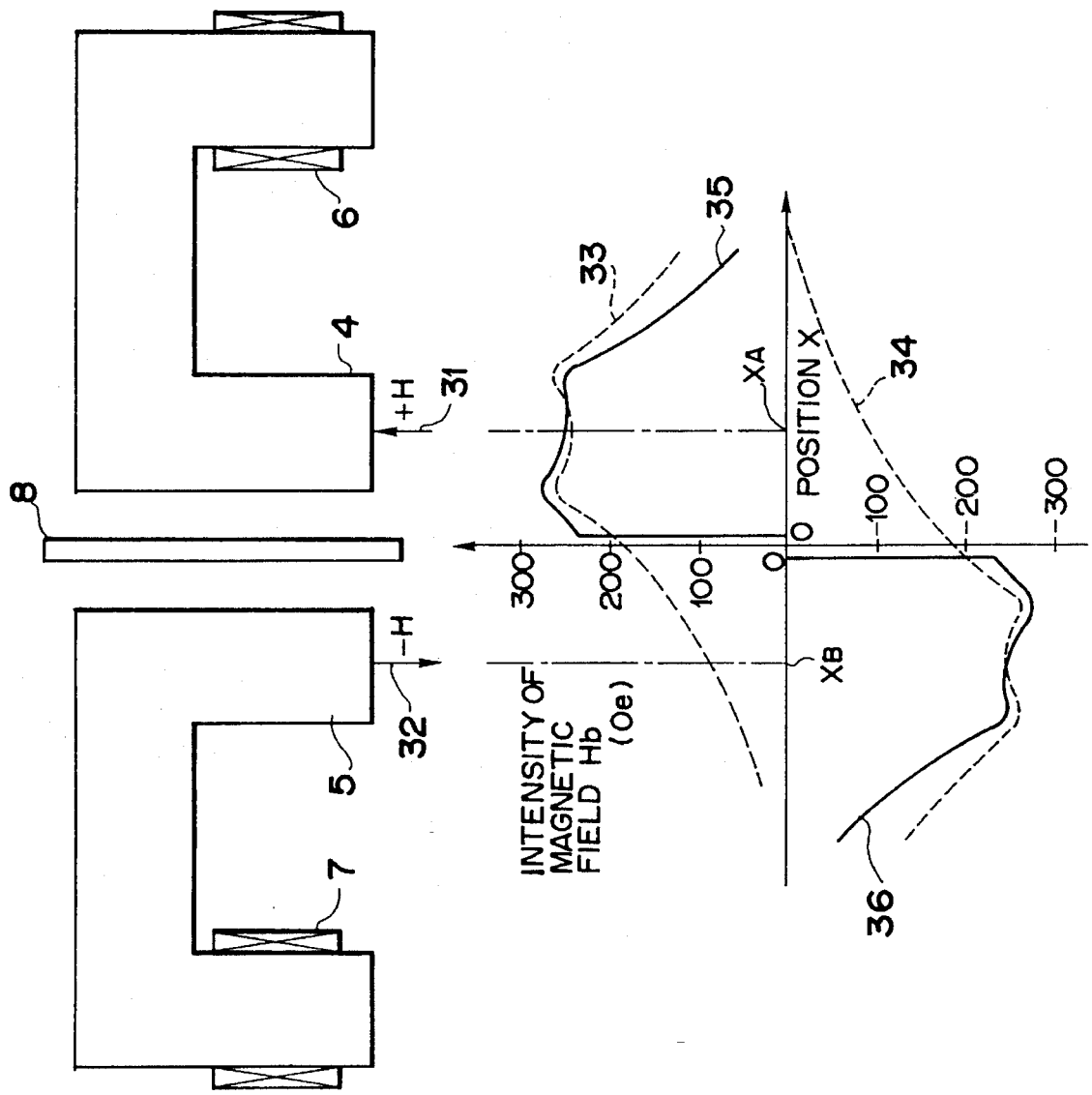
FIG. 7 is a front view showing a two-divided core in the magnetic head along with distribution of the magnetic field generated.

When the recording information (A) and (B) are different items of information, e.g., when the recording information (A) is " 1" with which an upward magnetic field + H is applied to the recording medium for upward magnetization and the recording information (B) is "0" with which a downward magnetic field − H is applied to the recording medium for downward magnetization, the magnetic fields generated in the present invention are represented by a graph in the lower side of FIG. 7.

More specifically, since the core 4 generates the upward magnetic field + H applied to the recording medium and the core 5 generates the downward magnetic field −H applied thereto, the intensity of the vertical magnetic field in the surface of the recording medium spaced several tens of microns from the lower end faces of the cores is distributed as indicated by a solid line 35 for the core 4 and by a solid line 36 for the core 5. As a comparison, in the conventional construction not including the magnetic member 8, the intensity of the vertical magnetic field is distributed as indicated by dotted lines 33 and 34. As will be seen from the comparison, the magnetic member 8 is effective to shield the core 4 from the magnetic field generated by the core 5 and also shield the core 5 from the magnetic field generated by the core 4. Stated otherwise, the magnetic fields generated by the respective cores are prevented by the magnetic member 8 from mutually affecting each other, allowing the cores to be driven independently.

With the arrangement that the magnetic member 8 made of soft magnetic material is disposed near both cores, another effect is provided in reducing the magnetic resistance on the side near the magnetic member 8 to thereby increase the intensity of the magnetic field required (such that the magnetic field is distributed more densely on the side near the magnetic member 8). As a result, the vertical magnetic fields applied to the recording medium 56 at a position $x_A$ corresponding to the focal point 64 and a position $x_B$ corresponding to the focal point 61 exhibit an intensity greater than ± 200 [Oe] and the wide scope of the effective magnetic field which are enough for recording of information to the recording layer 55.

Figure 8:
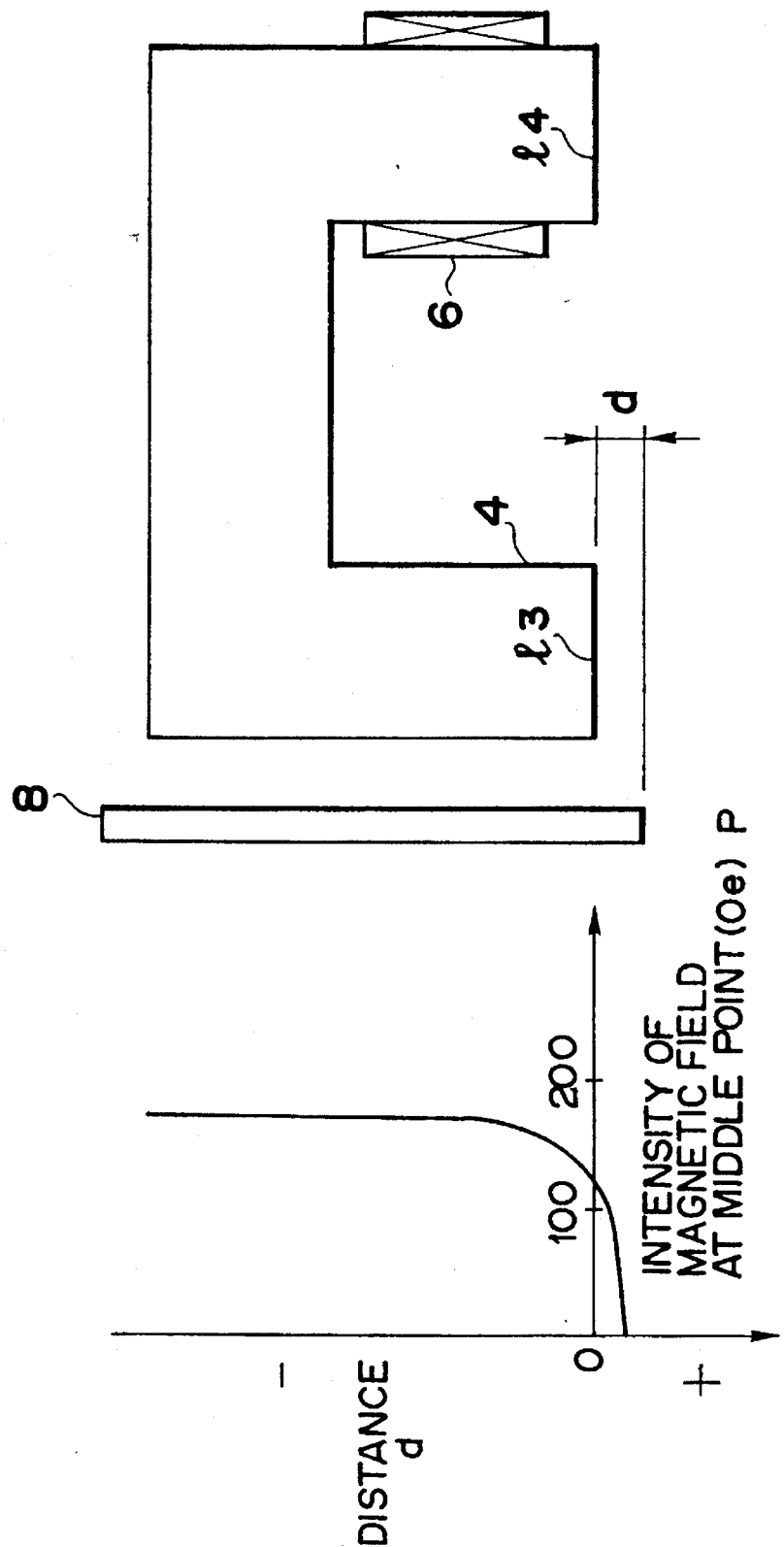
FIG. 8 is a view showing the relationship in distance between a magnetic member and the end face of a magnetic pole.

By referring to FIG. 8, there will now be explained the relationship in position between the end face of the magnetic member 8 and the end face of the magnetic pole $l_3$ of the core 4, both facing the recording medium, as well as the intensity of the magnetic field at a point P vertically to the end face of the magnetic member 8. A considerable relationship is found in a distance d between the lowermost face of the magnetic member 8 and the end face of the magnetic pole $l_3$ with respect to the intensity of the magnetic field at the point P. More specifically, the intensity of the magnetic field at the point P is about 120 [Oe] at d=0, but abruptly reduced upon the distance d slightly shifting toward the positive side owing to the effect of the magnetic member 8. For the reason, the magnetic head of the present invention is constructed so as to meet the relationship of d>0. As a consequence, any interference between the magnetic fields generated by the two cores can be completely eliminated as shown in FIG. 7 above.

Figure 11:
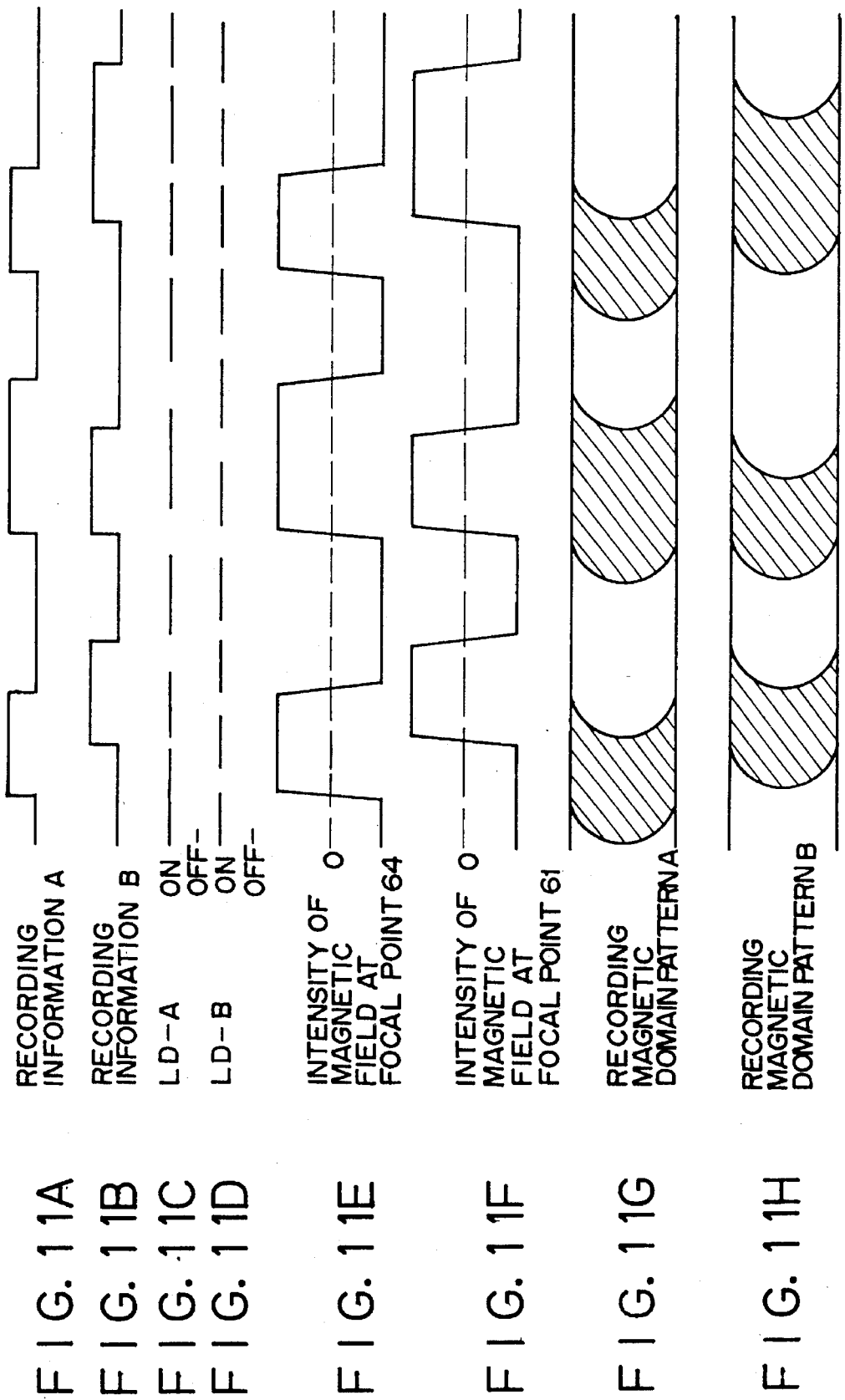
FIGS. 11A to 11H are a set of timing charts showing recording signals, magnetic field intensities and magnetic domain patterns.

FIG. 11 shows recording signals, magnetic field intensities and magnetic domain patterns when the magnetic field generator of the present invention is applied to multi-recording in the magneto-optical recording apparatus. In timing charts of FIG. 11, FIGS. 11A and 11B represent the recording information (A) and the recording information (B), respectively. Note that this embodiment adopts magnetic field modulation recording of the type emitting a laser beam continuously. Accordingly, as shown in FIGS. 11C and 11D, the laser beam sources (LD-A), (LD-B) are maintained at a high level during the recording, which level is necessary for recording of information to the recording medium. The intensities of the magnetic fields at the focal points 64, 61 are represented by FIGS. 11E and 11F. Therefore, recording magnetic domain patterns are represented by FIGS. 11G and 11H. In these drawings, the hatched regions indicate upwardly magnetized regions and blank regions indicate downwardly magnetized regions. Thus, the vertical magnetic field passing through the focal point 61 forms the magnetic domain pattern shown in FIG. 11H which is different from that generated at the focal point 64, thereby permitting the multi-recording.

The magnetic member 8 may be formed of soft magnetic material containing metals as main ingredients, for example, metallic material with high permeability such as Permalloy and Bendust. In this case, when a high frequency magnetic field is applied to the magnetic member, there occurs an eddy current therein which generates a magnetic field in the direction opposite to that of the magnetic field applied externally, resulting in an effect of suppressing the component of the magnetic field distributed toward the adjacent core. Further, the above-referred metallic magnetic member is easier to achieve high permeability and have better machinability than the soft magnetic material of ferrite.

As described above, according to this embodiment of the present invention, in a magneto-optical recording apparatus of the type that light from a semiconductor laser is irradiated to a magneto-optical recording medium on one side from an optical head, and magnetic fields are generated by a plurality of magnetic field generating portions from the opposite side of the magneto-optical recording medium, thereby recording and erasing information, the light from the optical head is irradiated in the form of plural beams to plural tracks or the same of the magneto-optical recording medium, cores of the magnetic field generating portions are divided into plural pieces and arranged in the direction of a track of the recording medium, a coil for generating a modulation magnetic field is wound around each core, and a member made of magnetic material is disposed between adjacent twos of the cores.

Moreover, the distance between the end face of a magnetic pole of each core and a recording layer of the magneto-optical recording medium is set to be larger than the distance between the member made of magnetic material and the recording medium.

With this embodiment of the present invention as fully described above, the light from the optical head is irradiated in the form of plural beams divided in the direction of a track of the magneto-optical recording medium, the cores of the magnetic field generating portions are divided into plural pieces and arranged in the direction of a track of the recording medium, the coil for generating the modulation magnetic field is wound around each core, and the member made of magnetic material is disposed between adjacent twos of the cores, it is possible to eliminate mutual influences of the magnetic fields generated by the adjacent cores and to drive the cores independently of each other, with the results of realizing multi-recording and speeding up the recording based on the modulation magnetic fields. In addition, by using the divided cores to apply the magnetic fields, the scope of the effective magnetic field generated by one core can be made smaller than conventionally and, therefore, high frequency modulation can be easily achieved.

Next, another embodiment of the present invention will be described in detail with reference to FIGS. 12 to 16. In these drawings, reference numeral 11 denotes a slider (base) of the magnetic head which is made of non-magnetic material. Two slide surfaces 12, 13 are formed in facing relation to airflow produced by rotation of a magneto-optical recording medium in the form of a disc, for example. Cores 14, 15 for generating modulation magnetic fields are built in either one of the slide surfaces 12, 13, e.g., in the slide surface 13. Winding coils 16, 17 are respectively wound around the cores 14, 15 to flow drive currents. Nearly at the middle position between the cores 14 and 15, there is placed a magnetic member 18 made of soft magnetic material and having a sectional area equal to an area of each core projected substantially in the direction of arrow C. The cores 14, 15 are arranged in the radial direction of the magneto-optical disc (i.e., a direction orthogonal to the direction of a track thereof) in which direction an optical head is subjected to tracking control.

The material of the magnetic member 18 desirably has sufficiently high permeability for a high frequency magnetic field. One example of such materials is Mn—Zn ferrite.

The cores 14, 15 respectively have magnetic poles $l_{13}$, $l_{14}$ and $l_{15}$, $l_{16}$ exposed perpendicularly to the slide surface 13. The magnetic poles $l_{13}$ and $l_{15}$ are used to apply vertical magnetic fields to the recording medium.

Figure 13A:
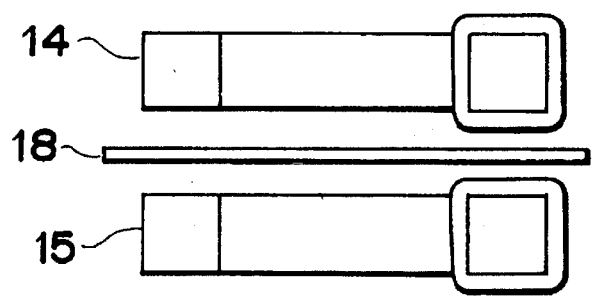
FIGS. 13A to 13C are a front, plan and end face view of a primary portion of the magnetic head in FIG. 12, respectively.
Figure 13C:
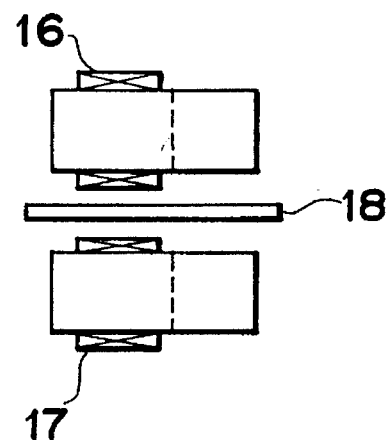
Figure 13B:
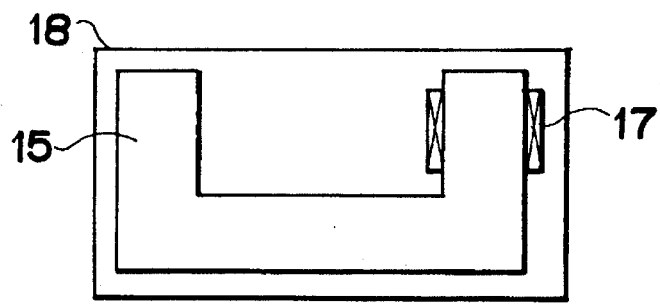

FIGS. 13A to 13C show an arrangement and construction of only the cores 14, 15, the coils 16, 17 and the magnetic member 18. The magnetic member 18 is disposed between the cores 14 and 15 not in contact therewith, and has a sectional area almost the same as an area of each core projected in the direction of arrow C in FIG. 12.

Figure 15:
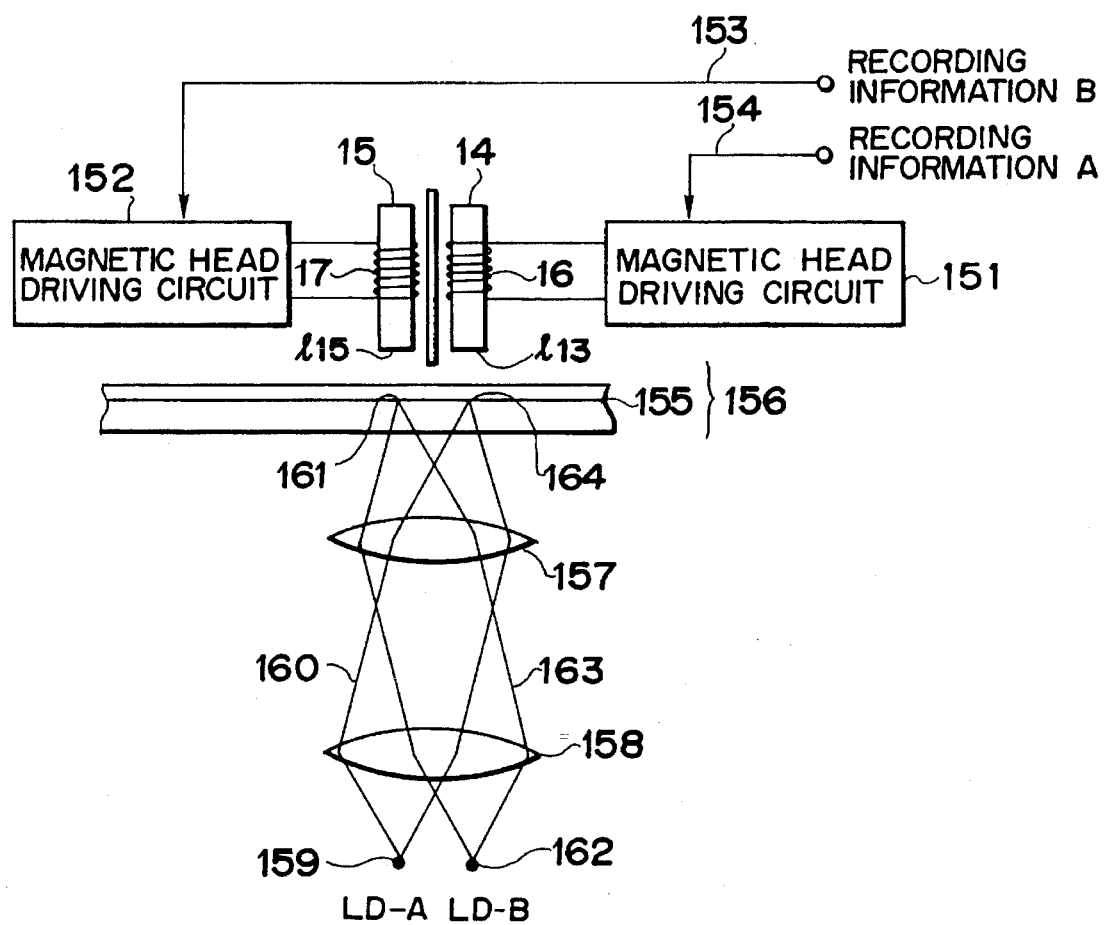
FIG. 15 is a view showing a relevant construction under a state of magneto-optical recording.

Then, as shown in FIG. 15, corresponding to scopes of the effective vertical magnetic fields generated by the cores 14, 15 around the magnetic poles $l_{13}$, $l_{15}$, an object lens 157 is disposed in the optical head on the opposite side of a recording medium (i.e., magneto-optical disc) 156 to the magnetic head, the object lens 157 being movable in the radial direction. For multi-recording, light beams 160, 163 emitted from semiconductor lasers (LD-A) 159 and (LD-B) 162 are focused by the object lens 157 onto a magneto-optical recording layer 155 in the magneto-optical disc at respective focal points 161, 164. The laser beam sources may be a multi-emission laser device constructed on the same chip, or may be two separate laser devices as long as they are optically identical to each other. While emission points of the semiconductor lasers 159, 162 are spaced on the order of about 100 μm from limitations in manufacture of the lasers, the light beams 160, 163 emitted from the lasers 159, 162 are converted by a collimator lens 158 into parallel beams and then focused by the object lens 157 onto the recording layer, as mentioned above, with a proper spacing between the focal points.

The coil 16 is driven by a magnetic head driving circuit 151 to generate a magnetic field with polarity dependent on recording information (A) 154, so that the vertical magnetic field dependent on the recording information 154 is applied from the magnetic pole $l_{13}$ to the focal point 164. Likewise, the coil 17 is driven by a magnetic head driving circuit 152 to generate a magnetic field with polarity dependent on recording information (B) 153, so that the vertical magnetic field dependent on the recording information 153 is applied from the magnetic pole $l_{15}$ to the focal point 161.

Figure 14:
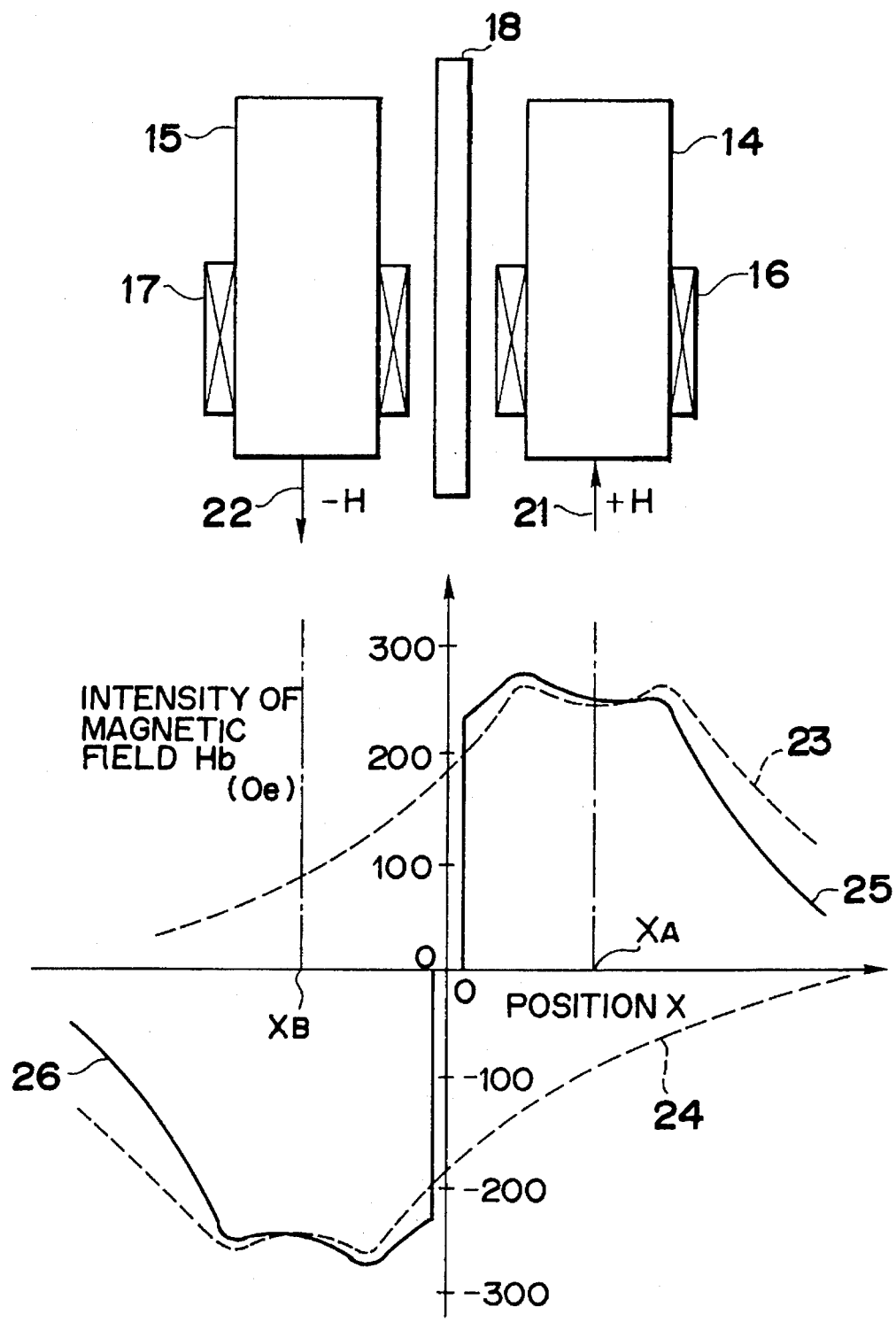
FIG. 14 is a front view showing a two-divided core in the magnetic head of FIG. 12 along with distribution of the magnetic field generated.

When the recording information (A) and (B) are different items of information, e.g., when the recording information (A) is "1" with which an upward magnetic field + H is applied to the recording medium for upward magnetization and the recording information (B) is "0" with which a downward magnetic field −H is applied to the recording medium for downward magnetization, the magnetic fields generated in the present invention are represented by a graph in the lower side of FIG. 14.

More specifically, since the core 14 generates the upward magnetic field + H applied to the recording medium and the core 15 generates the downward magnetic field −H applied thereto, the intensity of the vertical magnetic field in the surface of the recording medium spaced several tens of microns from the lower end faces of the cores is distributed as indicated by a solid line 25 for the core 14 and by a solid line 26 for the core 15. In comparison, in the conventional construction not including the magnetic member 18, the intensity of the vertical magnetic field is distributed as indicated by dotted lines 23 and 24. As will be seen from the comparison, the magnetic member 18 is effective to shield the core 14 from the magnetic field generated by the core 15 and also shield the core 15 from the magnetic field generated by the core 14. Stated otherwise, the magnetic fields generated by the respective cores are prevented by the magnetic member 18 from mutually affecting each other, allowing the cores to be driven independently.

With the arrangement that the magnetic member 18 made of soft magnetic material is disposed near both the cores, another effect is provided in reducing the magnetic resistance on the side near the magnetic member 18 to thereby increase the intensity of the magnetic field required (such that the magnetic field is distributed more densely on the side near the magnetic member 18). As a result, the vertical magnetic fields applied to the recording medium 156 at a position $x_A$ corresponding to the focal point 164 and a position $x_B$ corresponding to the focal point 161 exhibit an intensity greater than ± 200 [Oe] and a wide scope of the effective magnetic field which is enough for recording of information to the recording layer 155.

FIG. 16A through 16H show recording signals, magnetic field intensities and magnetic domain patterns when the magnetic field generator of the present invention is applied to multi-recording in the magneto-optical recording apparatus. In these timing charts, FIGS. 16A and 16B represent the recording information (A) and the recording information (B), respectively. Note that this embodiment adopts magnetic field modulation recording of the type emitting a laser beam continuously. Accordingly, as shown in FIGS. 16C and 16D, the laser beam sources (LD-A), (LD-B) are maintained at a high level during the recording. The intensities of the magnetic fields at the focal points 164, 161 are represented by FIGS. 16E and 16F. Therefore, a recording magnetic domain pattern is represented by FIG. 16G. In this drawing, the hatched regions indicate upwardly magnetized regions and blank regions indicate downwardly magnetized regions. Then, the vertical magnetic field passing through the focal point 61 forms a magnetic domain pattern shown in FIG. 16H which is different from that generated at the focal point 64, thereby permitting the multi-recording.

The magnetic member 18 may be formed of soft magnetic material containing metals as main ingredients, for example, metallic material with high permeability such as Permalloy and Bendust. In this case, when a high frequency magnetic field is applied to the magnetic member, there occurs an eddy current therein which generates a magnetic field in the direction opposite to that of the magnetic field applied externally, resulting in an effect of suppressing the component of the magnetic field distributed toward the adjacent core. Further, the above-referred metallic magnetic member is easier to achieve high permeability and have better machinability than the soft magnetic material of ferrite.

As described above, according to this embodiment of the present invention, in a magneto-optical recording apparatus of the type that light from a semiconductor laser is irradiated to a magneto-optical recording medium on one side from an optical head, and magnetic fields are generated by a plurality of magnetic field generating portions from the opposite side of the magneto-optical recording medium, thereby recording and erasing information, cores of the magnetic field generating portions are divided into plural pieces and arranged in the direction of movement of the optical head (i.e., in the tracking direction), a coil for generating a modulation magnetic field is wound around each core, and a member made of magnetic material is disposed between adjacent twos of the cores.

The magnetic material is made of material containing ferrite-base soft magnetic material as a main ingredient.

Alternatively, the magnetic material is made of material containing metal-base soft magnetic material as a main ingredient.

With this embodiment of the present invention as fully described above, the cores of the magnetic field generating portions are divided into plural pieces and arranged in the direction of movement of the optical head, the coil for generating the modulation magnetic field is wound around each core, and a member made of magnetic material is disposed between adjacent twos of the cores, it is possible to eliminate mutual influences of the magnetic fields generated by the adjacent cores and to drive the cores independently of each other, with the results of realizing multi-recording in the single optical head and speeding up the recording based on the modulation magnetic fields.

Hereinafter, other embodiments of the present invention will be described. In these embodiments, the thin film technique is employed to construct coils and magnetic yokes in such a manner as to obtain a plurality of magnetic field generating portions with less mutual interference, thereby providing a magnetic field generator for the purpose like magneto-optical recording which is suitable for driving at high frequency and can be adapted for multi-beam recording.

Figure 17A:
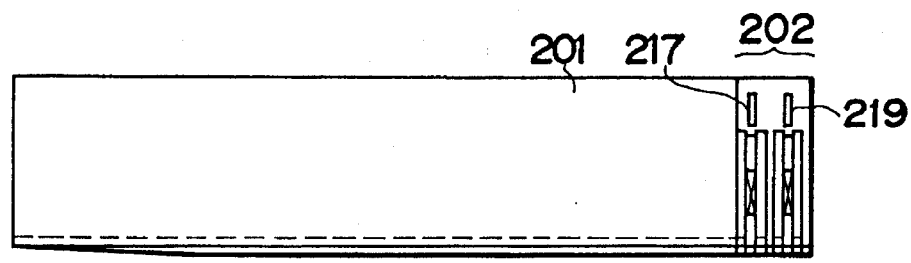
FIGS. 17A to 17C are views showing a slider of the magnetic head for use in the magneto-optical recording apparatus of the present invention.
Figure 17B:
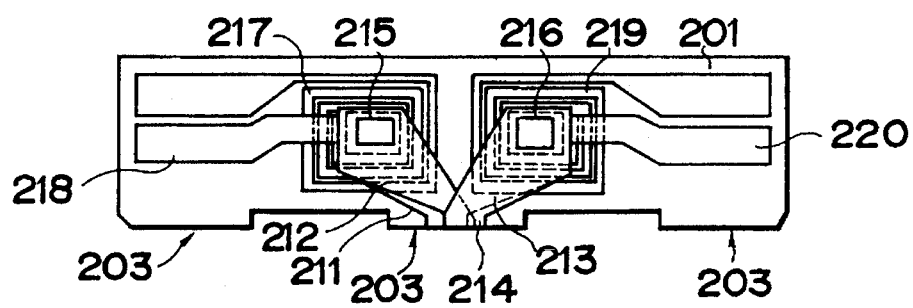
Figure 17C:
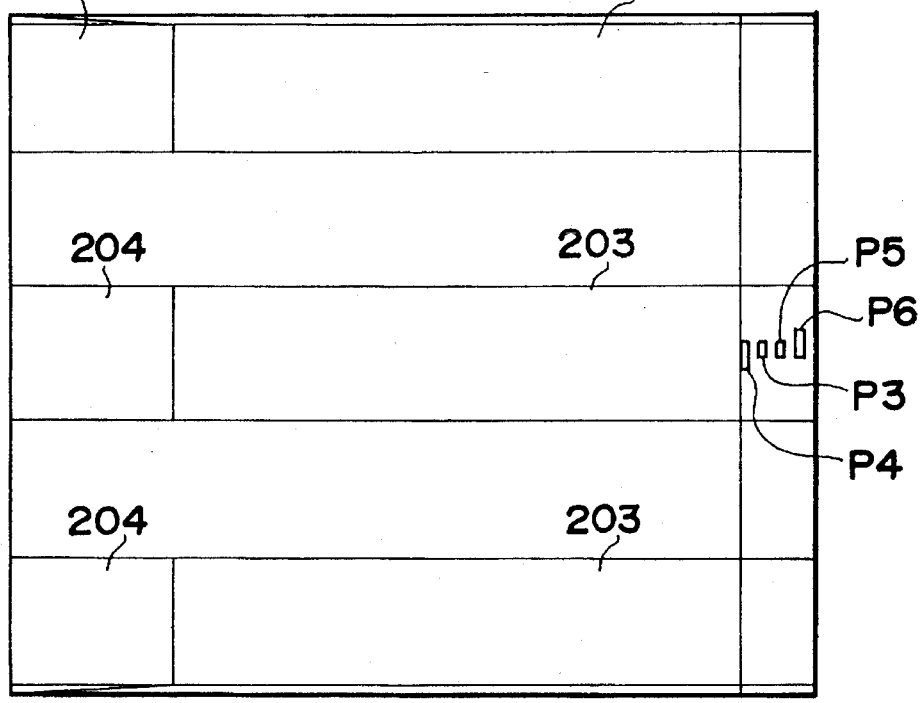

This type of one embodiment of the present invention will be explained below in detail with reference to FIGS. 17A to FIG. 24B. FIGS. 17A to 17C show a slider of a magnetic head in which a magnetic field generating portion 202 is constructed in part of a non-magnetic base 201 made of $Al_2O_3$—TiC or the like. A plurality of magnetic field generating elements, e.g., two in this embodiment, are constituted in the magnetic field generating portion 202. The magnetic field generating elements are formed through utilization of the thin film technique by laminating thin film coils and magnetic yokes in multiple layers, as described later in detail, with the base 201 being as a wafer. In this case, the thin film coils of the magnetic field generating elements are positioned in the layer surface to be different from each other, whereas the magnetic yokes of the magnetic field generating elements are positioned to overlap in the direction of the thickness of the multiple layers.

More specifically, both the magnetic field generating elements in this embodiment are constructed as shown in FIG. 17B. On the left side a lower yoke 211 made of soft magnetic material is first formed in the form of a thin film, a thin film coil 217 and a lead 218 connecting to the coil 217, both made of conductive material such as Cu, are formed thereon via an insulating layer, and further an upper yoke 212 is formed thereon via an insulating layer. The lower yoke 211 and the upper yoke 212 are connected to each other via a contact portion 215. On the right side, likewise, a lower yoke 213 is first formed, a thin film coil 219 and a lead 220 connecting to the coil 219 are formed thereon via an insulating layer, and further an upper yoke 214 is formed thereon via an insulating layer. The lower yoke 213 and the upper yoke 214 are connected to each other via a contact portion 216. As a result, both the magnetic field generating elements have their yokes positioned to be not overlapped with each other in the direction of the thickness of the multiple layers except the portions near the slide surface of the slider.

In the end face of the slider perpendicular to the slide surfaces on the side of the magnetic field generating portions, as shown in FIG. 17C, the lower yoke 211 and the upper yoke 212 of the left element function as magnetic poles $P_4$, $P_3$, respectively, and the lower yoke 213 and the upper yoke 214 of the right element function as magnetic poles $P_5$, $P_6$, respectively. As also seen from the drawing, the left and right elements are reversed in the magnitudes of the width of the upper and lower yokes. The reason is that the magnetic poles $P_3$, $P_5$ are set to have a minimum magnetic pole area with an intention of causing them serve as magnetic poles for generating modulation magnetic fields and also concentrating the magnetic fields, whereas the magnetic poles $P_4$, $P_6$ are set to have an increased magnetic field area with an intention of reducing the magnetic resistance to improve the efficiency and also preventing concentration of the magnetic fields so that excessive magnetic fields will not be applied to a recording surface. The magnetic pole surfaces of the magnetic poles $P_4$, $P_6$ are widened in opposite directions so that the magnetic yokes of the left and right elements will not increase their areas facing each other.

In this embodiment, the slider has three rails 203 and tapered portions 204 in the slide surfaces. As explained above, at the rear end of the central rail of the slider, there are provided the magnetic field generating portions to generate the vertical magnetic fields from the magnetic poles $P_3$, $P_5$.

FIG. 18 shows a construction of the magnetic field generating elements and their surroundings of the present invention when applied to the magneto-optical recording apparatus. In the drawing, the yokes 211, 212 and 213, 214 and the contact portions 215 and 216 are respectively represented as cores 222 and 225.

Then, corresponding to the scopes of the effective vertical magnetic fields generated by the magnetic poles $P_3$, $P_5$, an object lens 257 is disposed in an optical head on the opposite side of a recording medium (i.e., magneto-optical disc) 256 to the magnetic head, the object lens 257 being movable in the radial direction. For multi-recording, light beams 260, 263 emitted from semiconductor lasers (LD-A) 259 and (LD-B) 262 are focused by the object lens 257 onto a magneto-optical recording layer 255 in the magneto-optical disc at respective focal points 261, 264. The laser beam sources may by a multi-emission laser device constructed on the same chip, or may be two separate laser devices as long as they are optically identical to each other. While emission points of the semiconductor lasers 259, 262 are spaced on the order of about 100 μm from limitations in manufacture of the lasers, the light beams 260, 263 emitted from the lasers 259, 262 are converted by a collimator lens 258 into parallel beams and then focused by the object lens 257 onto the recording layer, as mentioned above, with a proper spacing between the focal points.

The coil 217 is driven by a magnetic head driving circuit 251 to generate a magnetic field with polarity dependent on recording information (A) 253, so that the vertical magnetic field dependent on the recording information 253 is applied from the magnetic pole $P_3$ to the focal point 261. Likewise, the coil 219 is driven by a magnetic head driving circuit 252 to generate a magnetic field with polarity dependent on recording information (B) 254, so that the vertical magnetic field dependent on the recording information 254 is applied from the magnetic pole P5 to the focal point 264.

Figure 19:
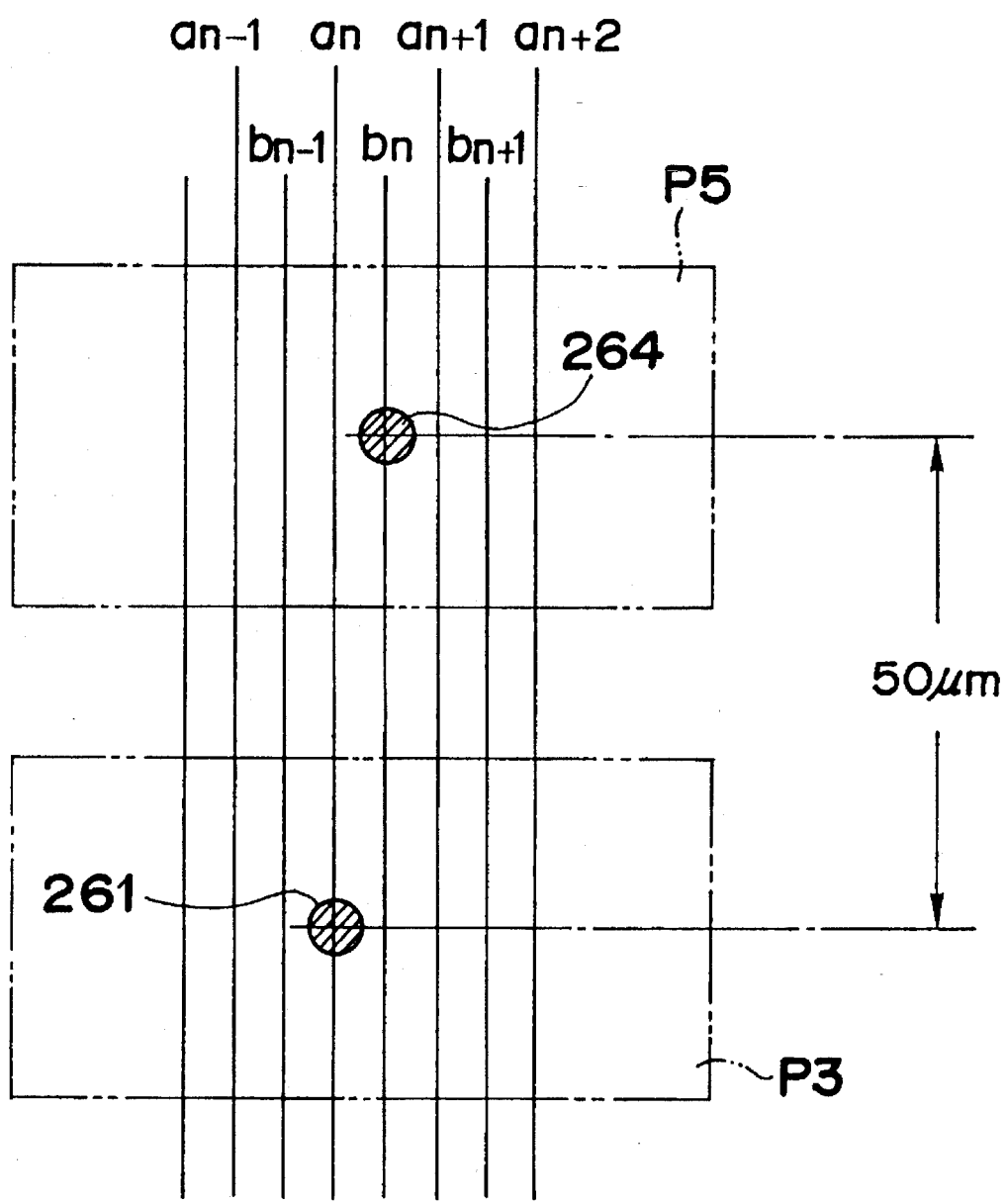
FIG. 19 is a diagram for explaining the relationship between a magnetic pole and a light beam focal position in the embodiment of FIG. 17.

When the two light beams irradiated from the optical head in the magneto-optical recording apparatus of the present invention are focused on the recording layer at the two focal points as stated above, the relationship in relative position between the focal points and the magnetic head as viewed from the optical head side is illustrated in FIG. 19. Here, the focal points 261, 264 are in positions respectively corresponding to the track numbers n and n+1 which are spaced on the order of about 50 μm from each other. In this embodiment, two tracks a, b are spirally formed on the recording medium independently of each other. Assuming now that the focal points 261, 264 are positioned on tracks $a_n$, $b_n$, therefore, after the recording medium makes a turn, the focal points shift to next tracks $a_{n+1}$, $b_{n+1}$, respectively. Note that the recording medium used may be other than one having two independent tracks. In the case of a usual recording medium having a single spiral track, one track jump may be performed for each rotation of the recording medium. To put it in more detail, with such an arrangement that the focal point 261 is shifted to the track $b_n$ and then to the track $a_{n+1}$ by the track jump after the recording medium makes a turn, there is a fear of erasing the information recorded on the track $b_n$ by the focal point 264.

The magnetic field generating elements are positioned on the opposite side to the optical head with the recording medium therebetween. Then, the focal points 261, 264 are substantially located in the scopes of the effective magnetic fields generated by the magnetic poles $P_3$, $P_5$ of the magnetic head. As a practical problem, it is desired that the lengths of the magnetic poles $P_3$, $P_5$ in the direction of the track width are set to be larger than their lengths in the direction of track so as to include a fine tracking scope of the optical head, i.e., to be about 60 μm or above. Also, the lengths of the magnetic poles $P_3$, $P_5$ in the direction of a track are desirably about 20 μm or above in consideration of an allowance for position accuracy between the optical head and the magnetic field generating elements. Accordingly, the spacing between the magnetic poles $P_3$ and $P_5$ is on the order of 15 to 20 μm. In addition, while the yokes and the magnetic poles are formed using the thin film technique, the length in the direction of the track width corresponds to a pattern width of the thin film and, therefore, the thin film technique can be optimally adopted in the present invention in which the length in the direction of the track width is to be enlarged.

As to the recording information (A) and (B) (see FIG. 18), for example, when the recording information (A) and the recording information (B) are different from each other, i.e., "0" and "1", respectively, the magnetic fields generated by the magnetic field generator in the present invention are represented by characteristics as shown in FIG. 20.

More specifically, when the core 225 generates an upward magnetic field +H for upward magnetization of the recording medium and the core 224 generates a downward magnetic field −H for downward magnetization of the recording medium, the intensity of the vertical magnetic field at a position x spaced on the order of 10 μm to 20 μm from the lower end faces of the cores is represented in the lower side of FIG. 20. Here, the magnetic field generated by the core 225 is indicated by a solid line 235, the magnetic field generated by the core 224 is indicated by a solid line 236, and the resultant one of both the magnetic fields is indicated by a broken line 234. This means that the magnetic field generated by one core is distributed at the lower end face of the other adjacent core as follows in the present invention. Specifically, because of small crosstalk of magnetic flux between the cores 224 and 225 in the present invention, the crosstalk component of the magnetic field generated by the coil 219, which passes from the core 225 to the core 224, has the same phase as a component 231 of +H at the lower end face of the adjacent core 224, while the component of opposite phase −H shifting from the lower end face of the core 225 to the lower end face of the core 224 is rather increased. It is thus found from the composition of both the components that the magnetic field generated by the core 225 becomes nearly zero at the lower end face of the adjacent core 224. As a result, the two cores can be driven independently of each other while producing the vertical magnetic fields with the intensity of ± 200 [Oe] or above sufficient for recording.

With the above construction, the magnetic path can be made smaller to be suitable for driving at high frequency, and the crosstalk between the two cores or the two coils can be so reduced as to provide two vertical magnetic fields which are close and capable of being driven independently of each other, thereby achieving high-speed recording based on the multi-recording.

Figure 21A:
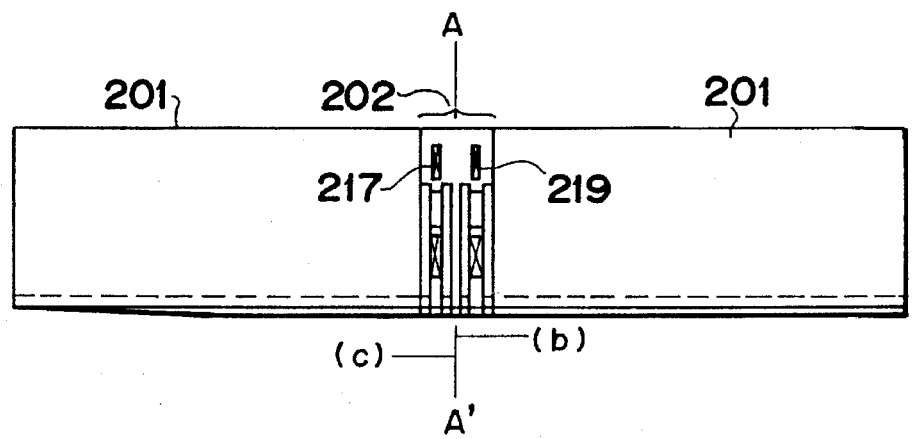
Figure 21B:
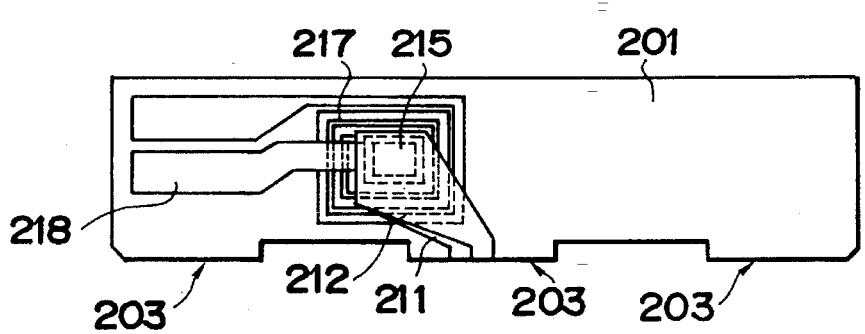
Figure 21C:
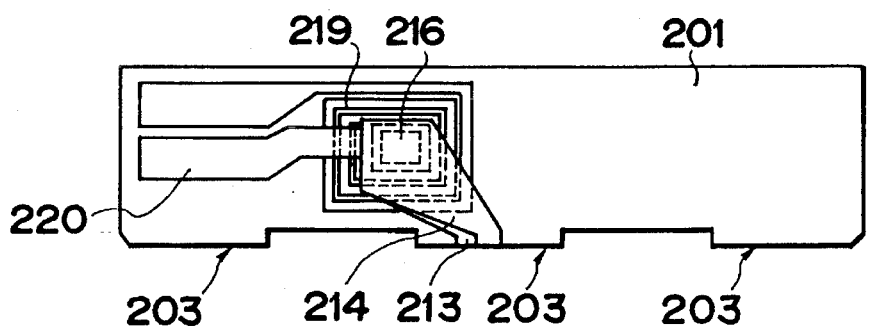

Next, another embodiment of the present invention will be described with reference to FIGS. 21A to 21C. Although the magnetic field generating portions are provided at the rear end of the slider in the above embodiment, they are provided in the central portion of the slider in this embodiment. The thin film technique is employed here as well. More specifically, as shown in FIG. 21A, a magnetic field generating portion 202 is formed at the central portion sandwiched between two bases 201 of the slider. The sectional left side view of the slider taken along the line A—A' is shown in FIG. 21B and the sectional right side view thereof is shown in FIG. 21C. By utilizing the thin film technique, only one magnetic field generating element is first formed on each of the bases 201 (on the left-hand half in this embodiment). The two bases 201 thus prepared independently are then abutted and bonded at the section A—A' using glass or the like via a protective film (being a transparent film and hence not shown in this embodiment), thereby constructing a single magnetic field generating portion which has a plurality of magnetic field generating elements. Accordingly, as will be seen also from FIGS. 21B and 21C, this embodiment only requires combining two bases having the same element pattern with each other, and thus can reduce the number of different type parts by half.

Figure 22A:
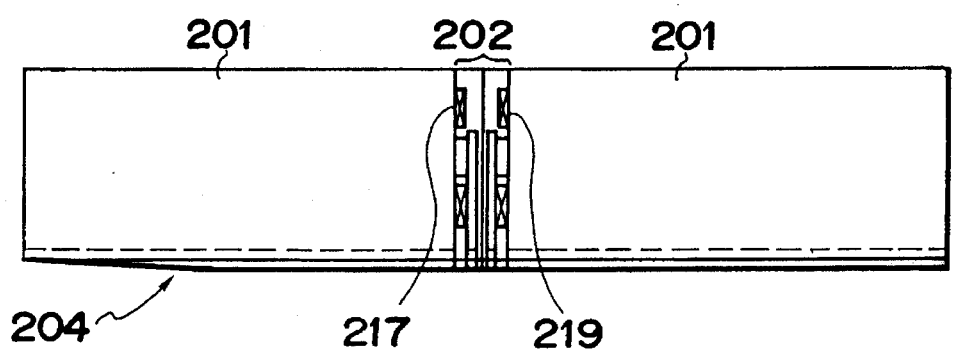
FIGS. 22A and 22B are views showing still another embodiment of the slider of the magnetic head for use in the magneto-optical recording apparatus of the present invention.
Figure 22B:
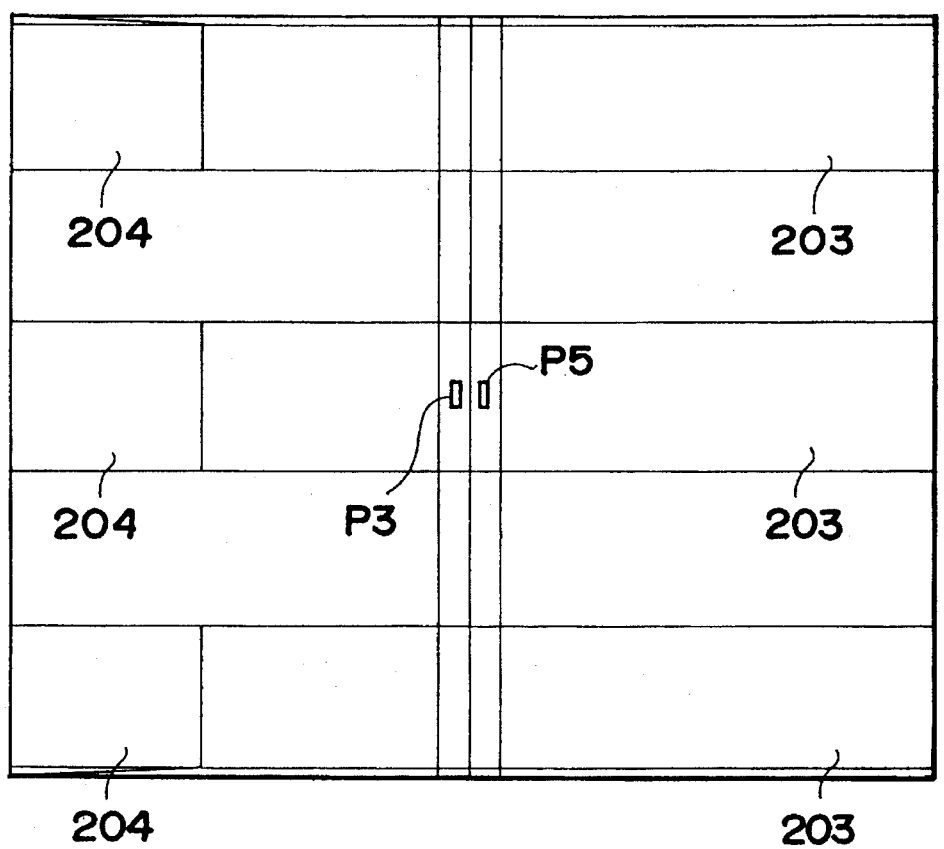

FIGS. 22A and 22B show still other embodiments. In the slider of this embodiment, the bases 201 are formed of soft magnetic ferrite to double as the lower yokes 211 and 212 in the embodiment of FIGS. 21A to 21C. Therefore, only the magnetic poles $P_3$, $P_5$ appear on the slide surface of the slider as shown in FIG. 22B. With such an arrangement, the number of steps necessary for formation of thin films can be further reduced to lower the production cost.

Figure 23A:
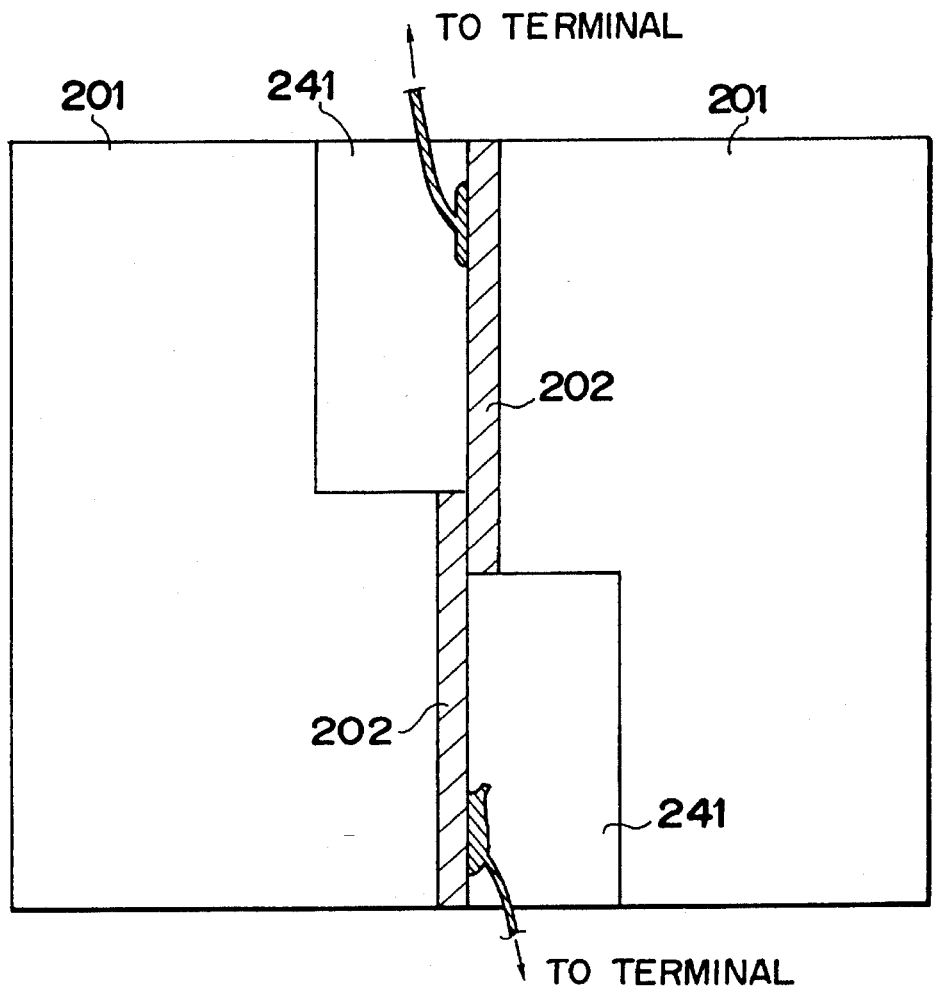
FIGS. 23A and 23B are views showing one embodiment of the electrode terminal structure in the embodiment of FIG. 22, FIGS. 24A and 24B are views showing still another embodiment of the slider of the magnetic head for use in the magneto-optical recording apparatus of the present invention.
Figure 23B:
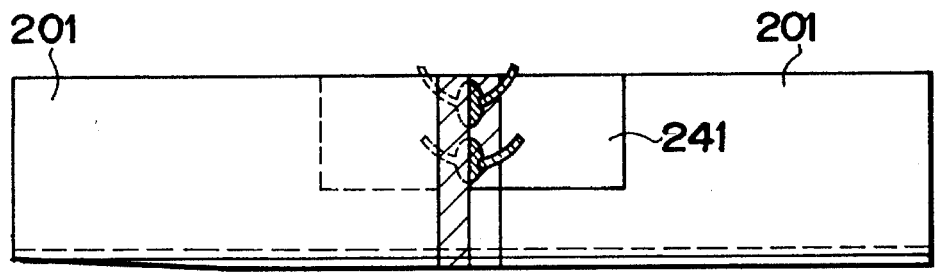

FIGS. 23A and 23B show one structure of the bases 201 in consideration of how to take out terminal electrodes of the thin film coils. With this structure, after constructing the magnetic field generating elements on the bases 201 by the thin film technique, each base 201 is machined on the side including no elements to form a notch 241. The notch 241 is also effective to reduce the crosstalk between the two adjacent yokes, when the lower yokes are formed of soft magnetic ferrite in the embodiment of FIG. 22.

Figure 24A:
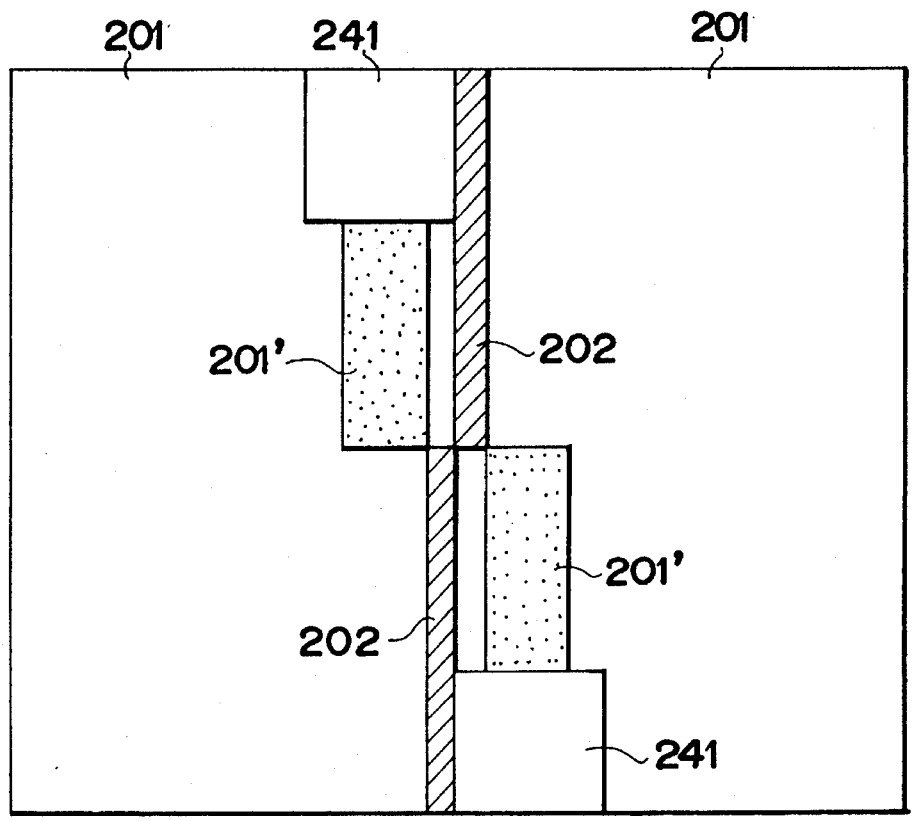
Figure 24B:
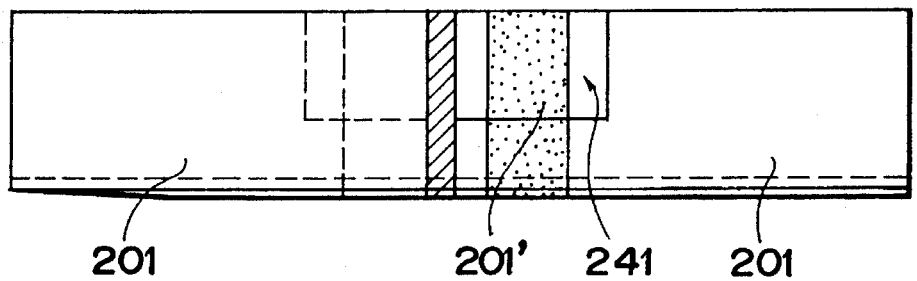

FIGS. 24A and 24B show still another embodiment in which the bases 201 are each formed of composite material of soft magnetic ferrite and glass. Therefore, prior to forming the magnetic field generating portion 202 by the thin film technique, a groove 201' with a depth of several hundreds of microns is defined in the base 201 and then buried with glass. Subsequently, the magnetic field generating elements are formed using those composite bases as wafers, and the resulting bases are abutted and bonded with each other similar to the above embodiments shown in FIGS. 21 and 22. In this embodiment, most parts of the elements are formed on the ferrite, but parts of the upper yokes, i.e., the magnetic poles, are formed in straddling relation to the ferrite and the glass. In assembly, the bases 201 are arranged such that the glass portion 201' of each base substantially faces the magnetic field generating element of the opposite base indicated as a hatched area. This enables preventing the magnetic flux from leaking toward the ferrite in the opposite side and thus provides a still greater advantage in combination with the aforesaid advantage of a reduction in the crosstalk due to the cutouts defined in the ferrite as obtainable with the embodiment of FIG. 22. Note that, in the illustrated embodiment, the cutout 241 is defined in such a manner as to straddle to both the glass portion 201' and the ferrite portion 201.

Although all those embodiments are explained by referring to the recording apparatus of the slider type such that a slider is floated on a recording medium upon rotation thereof, the magnetic field generating elements may be constructed to have a control mechanism capable of following fine up and down movements of the recording medium. In this case, the distance between the surface of the recording medium and the end face of the magnetic field generating portion is usually kept at a constant value between several microns and several tens of microns.

As described above, according to those embodiments of the magnetic field generator for use in the magneto-optical recording apparatus of the present invention, thin film coils and magnetic yokes are laminated in multiple layers to construct a plurality of magnetic field generating elements, the thin film coils of the magnetic field generating elements are positioned in the layer surface to be different from each other, and the magnetic yokes of the magnetic field generating elements are positioned to overlap in the direction of the thickness of the multiple layers.

The magnetic field generating elements are constructed on separate bases in each of which the thin film coil and the magnetic yokes are laminated in multiple layers, following which those bases are assembled such that their surfaces including the elements formed therein face in match with each other.

The base(s) in which the thin film coils and the magnetic yokes are laminated in multiple layers is/are made of soft magnetic ferrite which serves as parts of the magnetic yokes.

Further, a groove is partially defined in the soft magnetic ferrite and buried with glass to form a composite material. This composite material is used as a base for the magnetic field generating elements and the soft magnetic ferrite is used as parts of the magnetic yokes.

With those embodiments of the present invention of the construction as stated above in detail, it is possible to suppress the magnetic flux from leaking toward the adjacent core and to drive the cores in an independent manner, thereby speeding up recording based on the multi-recording. Also, by adopting the thin film technique, the magnetic path can be made with smaller size and high-frequency modulation can be facilitated, enabling production of a vertical magnetic field sufficient for modulation recording more than 200 [Oe], for example. In addition, the scope of the effective magnetic field can be so wide as to cover a fine tracking scope of the optical head.

Still another embodiment of the present invention will be described below. FIG. 25A shows a magnetic field generator of the floating slider type according to this embodiment in which a plurality of magnetic field generating elements, for example, four as shown in enlarged detail of FIG. 25B, are arranged on a non-magnetic base 301 made of $Al_2O_3$—TiC or the like. The magnetic field generating elements 301 each comprise a magnetic yoke 302, a magnetic pole 303 for generating and concentrating a magnetic field, and a coil 304. These components are formed by the thin film technique using the base 301 as a wafer.

With respect to the slider, a magneto-optical recording medium rotationally travels in the y-direction in FIGS. 25A and 25B. On this occasion, the recording medium and the slider are arranged and constructed such that the slider travels in a floating condition with a small spacing distance (in the z-direction) of several microns and several tens of microns. To perform smooth travel in a floating condition, the sliders are formed with rails, tapered portions and terminals for connecting the exterior and the coils.

Figure 26:
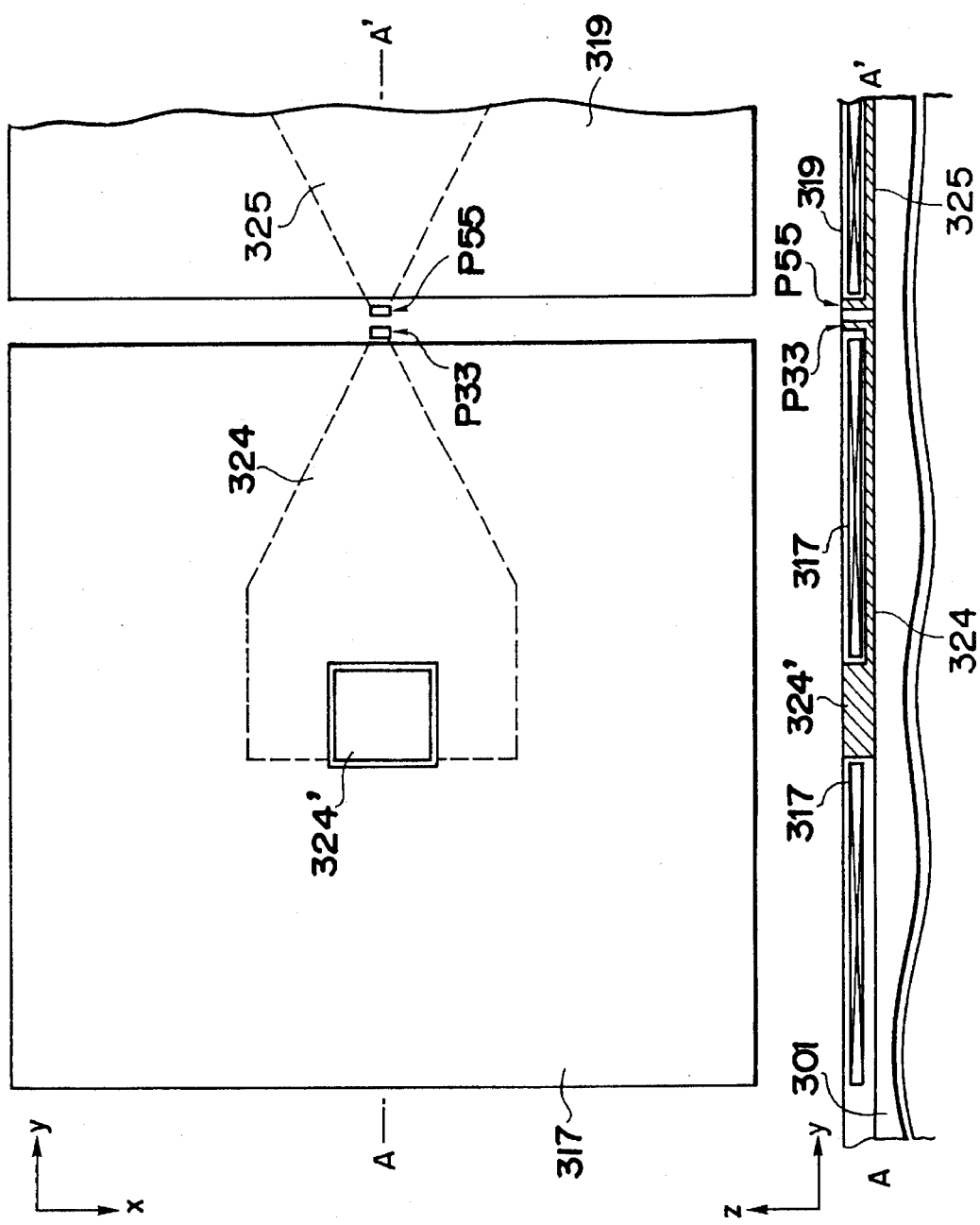
FIG. 26 is a plan and sectional view of the embodiment of FIG. 25 in the case of having two elements.

The magnetic field generating elements will be next explained with reference to FIG. 26. FIG. 26 shows the case of two magnetic field generating elements in a plan view and a sectional view taken along the line A—A'. Here, two magnetic yokes 324, 325 are formed on the base 301 using an alloy film of highly saturated magnetic flux density and, thereafter, two thin coils film 317 and 319 are spirally formed via insulating material. The coils may be spirally formed in multiple layers. Note that the coil is not illustrated in FIG. 26 as being separated into each turn. Then, using an alloy film of highly saturated magnetic flux density, magnetic poles $P_{33}$ and $P_{55}$ are connected to the respective yokes and formed to project upwardly from the base surface. These magnetic poles are essential to effectively apply magnetic fields vertical to the recording medium surface. At the same time, a yoke 324' may be additionally provided at the center of each spiral coil. The magnetic yoke serves to efficiently introduce the magnetic field to the magnetic pole and is tapered toward the magnetic pole side from the coil side. It is desirable that the magnetic pole has a length in the direction of the tracking width (i.e., in the x-direction in FIG. 26) on the order of 60 μm so as to include a fine tracking scope of the optical head, and a length in the direction of a track (i.e., in the y-direction in FIG. 26) greater than about 20 μm in view of alignment accuracy between the optical head and the magnetic field producing element. Accordingly, the magnetic yoke is desirably several tens of microns from the standpoint of the efficiency.

Figure 27:
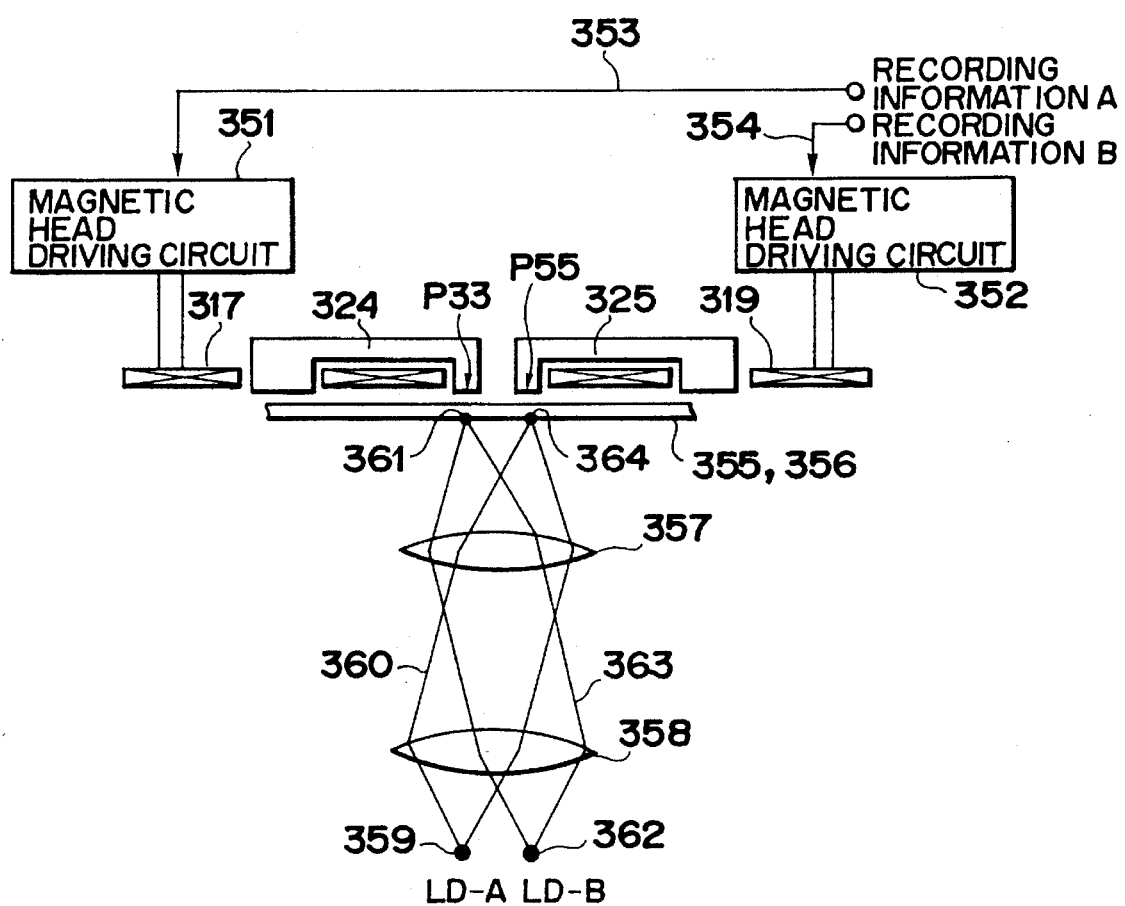
FIG. 27 is a view showing a construction of surroundings of a magnetic field generator in the embodiment of FIG. 25.

Construction of the magnetic field producing elements and their surroundings will now be explained with reference to FIG. 27. Corresponding to scopes of the effective vertical magnetic fields generated by the magnetic poles $P_{33}$, $P_{55}$, an object lens 357 is disposed on the opposite side of a recording medium (i.e., magneto-optical disc) 356 to the magnetic head, the object lens 357 being movable in the radial direction. For multi-recording, light beams 360, 363 emitted from semiconductor lasers (LD-A) 359 and (LD-B) 362 are focused by the object lens 357 onto a magneto-optical recording layer 355 in the magneto-optical disc at respective focal points 361, 364. The laser beam sources may be a multi-emission laser device constructed on the same chip, or may be two separate laser devices as long as they are optically identical to each other. While emission points of the semiconductor lasers 359, 362 are spaced on the order of about 100 μm from limitations in manufacture of the lasers, the light beams 360, 363 emitted from the lasers 359, 362 are converted by a collimator lens 358 into parallel beams and then focused by the object lens 357 onto the recording layer, as mentioned above, with a proper spacing between the focal points, e.g., about 40 μm.

The coil 317 is driven by a magnetic head driving circuit 351 to generate a magnetic field with polarity dependent on recording information (A) 353, so that the vertical magnetic field dependent on the recording information 353 is applied from the magnetic pole $P_{33}$ to the focal point 361. Likewise, the coil 319 is driven by a magnetic head driving circuit 352 to generate a magnetic field with polarity dependent on recording information (B) 354, so that the vertical magnetic field dependent on the recording information 354 is applied from the magnetic pole $P_{55}$ to the focal point 364.

Since the focal points 361 and 364 are located to be spaced about 40 μm in the direction of a track from each other, the spacing between the magnetic poles $P_{33}$ and $P_{55}$ is about 15 μm on an assumption that the magnetic pole is 25 μm long.

Figure 28:
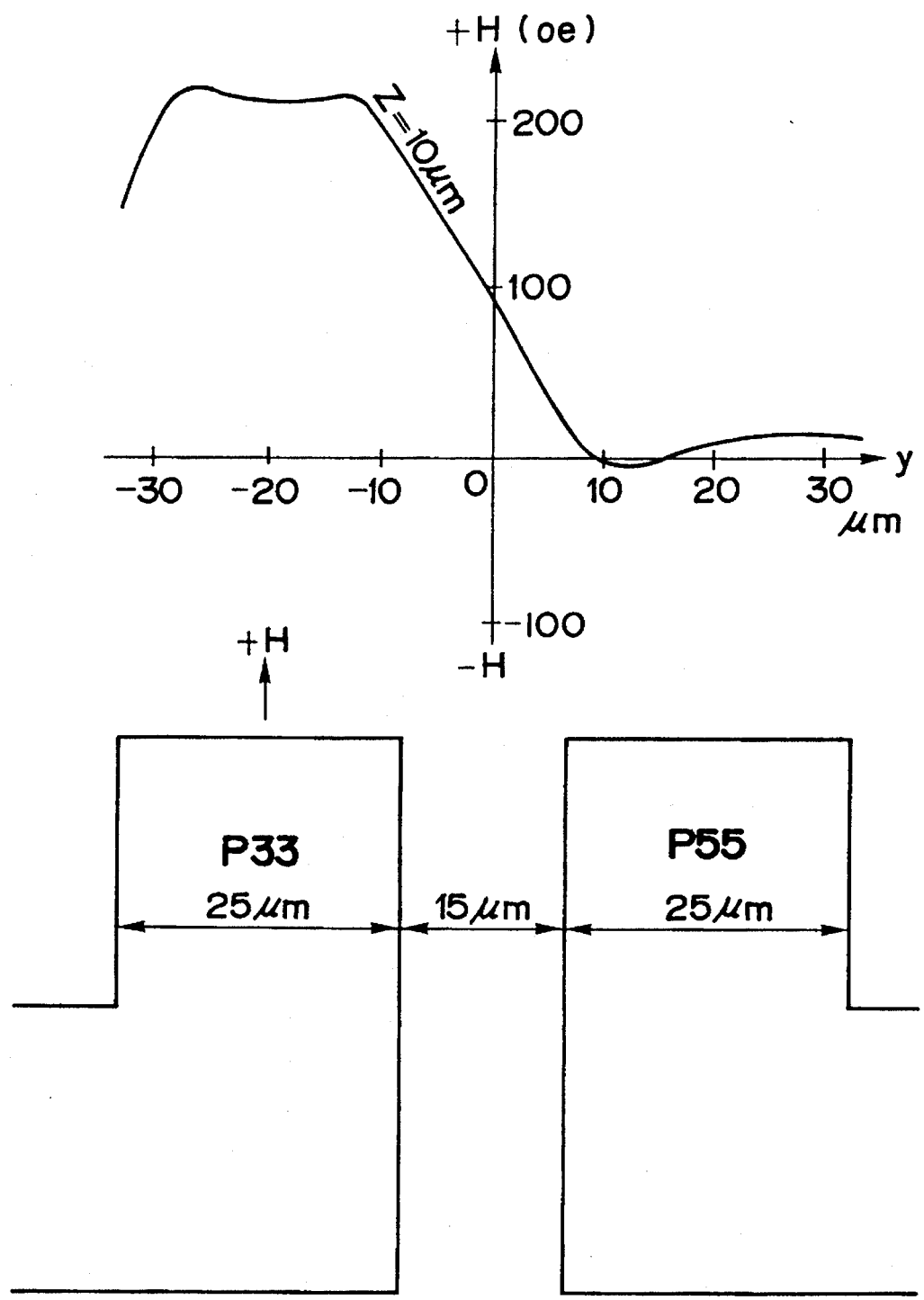
FIG. 28 is a diagram for explaining a distribution of the magnetic field generated in the embodiment of FIG. 25 in the case of having two elements.

By referring to FIG. 28, there will now be explained a distribution of the magnetic field generated when an electric current is passed through one coil 317 in the above magnetic field generating elements. A curve in the drawing is one example of the result of numerical calculation using the finite element method, and represents distribution of the magnetic field at a position spaced 10 μm upwardly from the magnetic poles in the z-direction. When the magnetic pole having a length of 25 μm in the y-direction is excited to + H, the magnetic field generated above the adjacent magnetic pole $P_{55}$ is much smaller than that generated above the magnetic pole $P_{33}$, meaning that both the elements can be driven independently of each other. Note that the gap between the magnetic poles $P_{33}$ and $P_{55}$ at this time is 15 μm as indicated in the drawing. The reason why both the elements can be driven independently of each other is primarily in that because of the thin film construction, the areas of the adjacent magnetic poles facing each other are small and the magnetic flux is less leaked.

With the above construction, the magnetic path can be made smaller to be suitable for driving at high frequency, and the crosstalk between the plurality of elements can be so reduced as to provide vertical magnetic fields which are close and capable of being driven independently of each other, thereby achieving multi-recording for multiple beams, particularly, three or more beams, and hence realizing high-speed recording.

Figure 29:
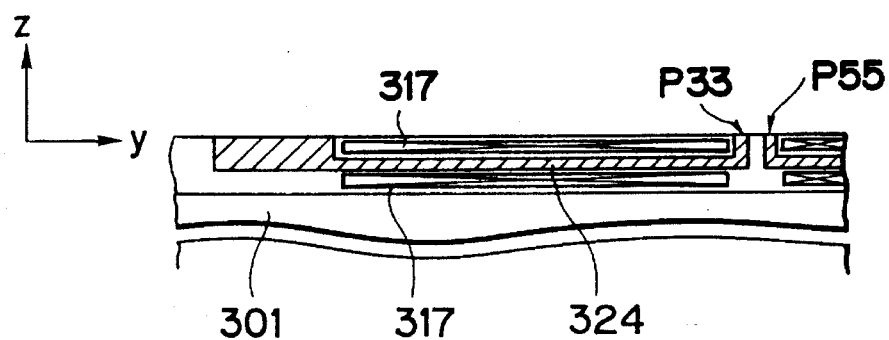
FIGS. 29 and 30 are sectional views of elements showing other embodiments.

FIG. 29 shows still another embodiment of the present invention in sectional view of a magnetic field generating element. In this embodiment, the coil is wound not in the form of a planar spiral as mentioned above, but in the form of a flat solenoid with the magnetic yoke 324 as a center core. The coil in such a shape can be formed with the thin film process by connecting upper and lower coil portions relative to the magnetic yoke 324 for each turn.

With this embodiment, the thickness of the elements and the layers of the construction are both increased as compared with the above embodiment, and more advanced manufacture technology is required. However, the efficiency of generating magnetic fields can be raised over 50%, making it possible to reduce the number of turns, diminish the size of the magnetic circuit, and suppress the exciting current, with the result of alleviating the burden of the exciting circuit. Further, as described later, even at a position spaced more than 10 μm upwardly from the magnetic poles in the z-direction, the magnetic field generated by the adjacent core (i.e., the crosstalk component) is small to allow independent driving of the elements and increase the floating amount of the slider, whereby safety is enhanced in points such as to avoid a clash of the slider against the recording medium.

Figure 30:
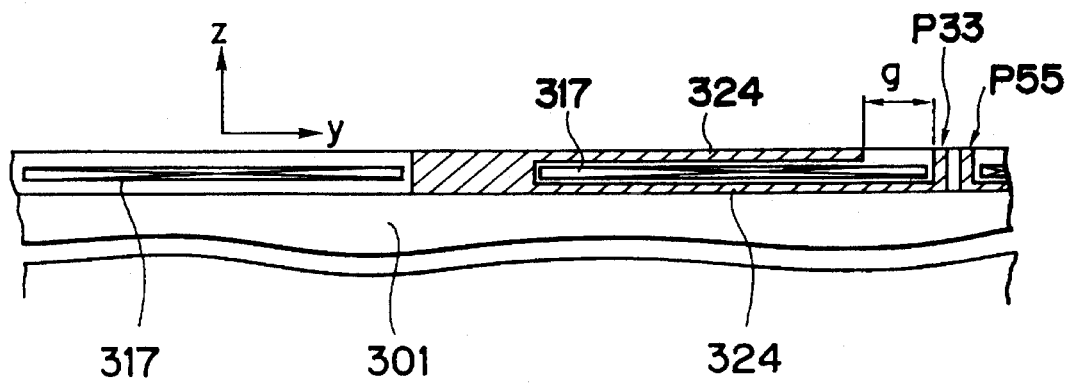

FIG. 30 shows still another embodiment of the present invention. In this embodiment, the coil 317 is wound in the form of a planar spiral, but the magnetic yoke 324 is extended to a position in the vicinity of the magnetic pole on the coil upper surface to serve as a return magnetic path for providing the construction near a closed magnetic path. Therefore, although the thickness of the elements and the layers of the construction are both increased like the above embodiment, the efficiency of generating magnetic fields is raised over twice in comparison with the first embodiment of FIG. 25. In design, however, the following points must be taken in mind.

Figure 31:
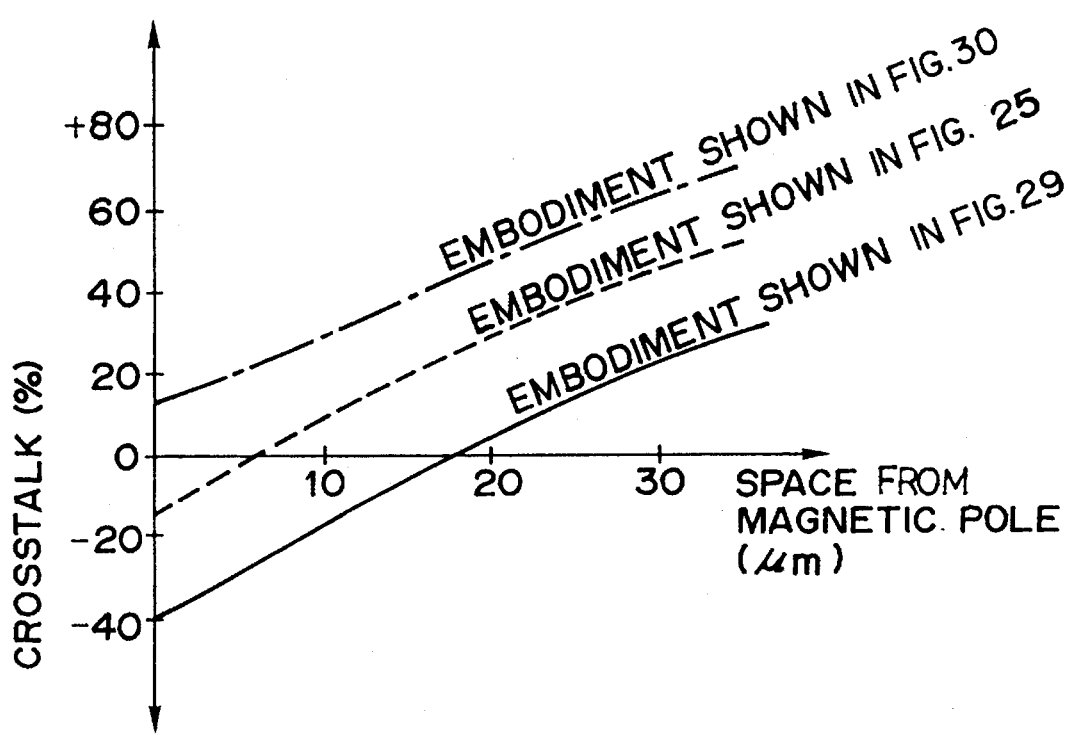
FIG. 31 is a graph for comparing levels of crosstalk in the respective embodiments.

FIG. 31 shows, for comparison, proportions of leaked magnetic fields as produced when the two magnetic field generating elements in the above embodiments are positioned adjacent to each other (the plotted values in the drawing are obtained from numerical calculations using the finite element method as with the above case). The ordinate represents the ratio (referred to as "crosstalk" here) of an average value of the magnetic field above the adjacent magnetic pole to an average value of the magnetic field generated above the magnetic pole on the exciting side when the left element is excited in FIG. 28. The abscissa represents a distance (space) from the magnetic pole in the z-direction. Thus, the plotted curve indicates dependency of the crosstalk on the space. Note that parameters such as the spacing between the magnetic poles are common to all the embodiments. As will be found from FIG. 31, in the first embodiment of FIG. 25, the crosstalk becomes zero at the position spaced about 8 μm. In the second embodiment of FIG. 29, the crosstalk becomes zero at the position spaced about 18 μm. In the third embodiment of FIG. 30, however, the crosstalk does not become zero even at the position immediately above the magnetic pole (with no space) and generates a magnetic field of the same phase as the excited magnetic field. The reason is because the magnetic flux generated by the magnetic pole on the exciting side goes back to the return magnetic path and the component of opposite phase returning to the adjacent magnetic pole after a U-turn above the magnetic pole on the exciting side. It is thus understood that the crosstalk depends on a gap g between the magnetic pole and the return magnetic path in FIG. 30.

While the embodiment of FIG. 30 shows the case of g=25 μm, the crosstalk can be reduced to approach the curve of the first embodiment by widening the gap g. On the other hand, increasing the gap g lowers the efficiency of generating magnetic fields. It is therefore required to search an optimum design value. Also, it is to be noted that changes in the intensity of the magnetic field generated in the exciting side dependent on the y-direction position above the core are greater than those in the first and second embodiments.

Although all those embodiments are explained by referring to the recording apparatus of the slider type such that a slider is floated on a recording medium upon rotation thereof, the magnetic field generating elements may be constructed to have a control mechanism capable of following fine up and down movements of the recording medium. In this case, the distance between the surface of the recording medium and the end face of the magnetic field generating portion is usually kept at a constant value between several microns and several tens of microns.

By combining the construction of the coil shown in the embodiment of FIG. 29 with the construction of the magnetic yoke shown in the embodiment of FIG. 30, the efficiency of generating magnetic fields can be further enhanced. Although the construction including only two elements is explained by referring to the embodiments of FIGS. 29 and 30, three or more elements may be included as shown in the embodiment of FIG. 25.

As described above, according to those embodiments of the magnetic field generator for use in the magneto-optical recording apparatus of the present invention, a plurality of magnetic field generating elements are formed on the surface of a non-magnetic base facing a recording medium in parallel, the magnetic field generating elements have thin film coils, magnetic yokes and magnetic poles independently of each other, the magnetic poles are each formed to project upwardly of the base surface from one end of the corresponding magnetic yoke, and the magnetic poles of the magnetic field generating elements are disposed adjacent to each other.

With those embodiments of the present invention of the construction as stated above in detail, it is possible to suppress the magnetic flux from leaking toward the adjacent core and drive the cores in an independent manner, thereby speeding up recording based on the multi-recording. Also, by adopting the thin film technique, the magnetic path can be made with smaller size and high-frequency modulation can be facilitated, enabling to produce the vertical magnetic field sufficient for modulation recording more than 200 [Oe], for example. In addition, the scope of the effective magnetic field can be so wide as to cover a fine tracking scope of the optical head. Particularly, in those embodiments, three or more magnetic field generating elements can be disposed side by side, while allowing the elements to be driven independently of each other even at the array pitch of magnetic field generating portions on the order of about 50 μm, thereby permitting adaptation to the multi-recording for three or more beams and achieving speed-up of the recording.

What is claimed is:

1. A magnetic field generator for applying a magnetic field to a recording medium, said magnetic field generator comprising:

a base;

a plurality of magnetic field generating cores formed on said base, said magnetic field generating cores being arranged in the direction of a track on the recording medium;

magnetic field generating coils respectively wound around said plurality of magnetic field generating cores; p1 a magnetic material member being disposed between adjacent twos of said plurality of magnetic field generating cores, an end face of said magnetic material member projecting from a respective end face of said magnetic field generating cores; and drive means capable of independently driving each of said plurality of magnetic field generating coils.

2. A magnetic field generator according to claim 1, wherein said base is a slider made of a non-magnetic material.

3. A magnetic field generator according to claim 1, wherein said magnetic material member shields the magnetic field generated from said cores.

4. A magneto-optical recording apparatus comprising:

an optical head for irradiating a plurality of recording light beams to a magneto-optical recording medium for recording; and a magnetic field generator having a plurality of magnetic poles for applying magnetic fields to the magneto-optical recording medium corresponding to each of the plurality of recording light beams, said magnetic field generator comprising (i) a base, (ii) a plurality of magnetic field generating cores formed on said base, said magnetic field generating cores being arranged in the direction of a track on the recording medium, (iii) magnetic field generating coils respectively wound around said plurality of magnetic field generating cores, (iv) drive means capable of independently driving each of said plurality of magnetic field generating coils, and (v) a magnetic material member being disposed between adjacent twos of said plurality of magnetic field generating cores, an end face of said magnetic material member projecting from a respective end face of said magnetic field generating cores in a direction towards the magneto-optical recording medium.

5. A magneto-optical recording apparatus according to claim 4, wherein said base is a slider made of a non-magnetic material.

6. A magneto-optical recording apparatus according to claim 4, wherein said magnetic material member shields the magnetic field generated from said cores.

7. A magneto-optical recording apparatus comprising:

an optical head for irradiating a light beam to a magneto-optical recording medium; and a magnetic field generator for applying magnetic fields to said magneto-optical recording medium, said magnetic field generator comprising thin film coils and magnetic yokes, which are laminated in multiple layers to form a plurality of magnetic field generating elements, said thin film coils of said magnetic field generating elements being positioned at different locations from one another in the layer surface, and respective ones of said magnetic yokes of said magnetic field generating elements being positioned to overlap one another in the direction of the thickness of the multiple layers.

8. A magneto-optical recording apparatus according to claim 7, further comprising an insulation layer arranged between said magnetic yoke and said thin film coil.

9. A magneto-optical recording apparatus according to claim 7, wherein said optical head irradiates a plurality of light beams onto said recording medium.

10. A magneto-optical recording apparatus according to claim 7, wherein said magnetic field generator is provided on a slider.

11. A magneto-optical recording apparatus according to claim 7, further comprising driving means for driving said plurality of magnetic field generating elements independently.

12. A magneto-optical recording apparatus comprising:

an optical head for irradiating a light beam to a magneto-optical recording medium; and a magnetic field generator for applying magnetic fields to said magneto-optical recording medium, said magnetic field generator comprising a base surface, in which a plurality of magnetic field generating elements having thin film coils, magnetic yokes and magnetic poles are formed on said base surface independently of each other, said magnetic poles each projecting upwardly of said base surface from one end of a corresponding magnetic yoke, and said magnetic poles of said magnetic field generating elements being disposed adjacent to each other.

13. A magneto-optical recording apparatus according to claim 12, wherein said optical head irradiates a plurality of light beams onto said recording medium.

14. A magneto-optical recording apparatus according to claim 12, wherein said magnetic field generator is provided on a slider.

15. A magneto-optical recording apparatus according to claim 12, further comprising driving means for driving said plurality of magnetic field generating elements independently.

16. A magneto-optical recording apparatus according to claim 12, further comprising an insulation material arranged between said thin film coil and said magnetic yoke.

17. A magneto-optical recording apparatus comprising:

an optical head for irradiating a plurality of recording light beams to a magneto-optical recording medium for recording; and a magnetic field generator having a plurality of magnetic poles for applying magnetic fields to the magneto-optical recording medium corresponding to the plurality of recording light beams, said magnetic field generator comprising (i) a base, (ii) a first magnetic field generating core formed on said base, said magnetic field generating core being arranged in the direction of a track on the recording medium, (iii) a first magnetic field generating coil wound around said first core, (iv) first driving means for driving said first coil, (v) a second magnetic field generating core formed on said base, (vi) a second magnetic field generating coil wound around said core and (vii) second driving means for driving said second coil.

18. A magneto-optical recording apparatus according to claim 17, further comprising a magnetic material member provided between said first and second magnetic field generating cores and projecting from end faces of said cores in a direction along the magneto-optical recording medium.

19. A magnetic field generator for applying a magnetic field to a recording medium, said magnetic field generator comprising:

a magnetic field generator for applying magnetic fields to said magneto-optical recording medium, said magnetic field generator comprising thin film coils and magnetic yokes, which are laminated in multiple layers to form a plurality of magnetic field generating elements, said thin film coils of said magnetic field generating elements being positioned at different locations from one another in the layer surface, and respective ones of said magnetic yokes of said magnetic field generating elements being positioned to overlap one another in the direction of the thickness of the multiple layers.

20. A magnetic field generator according to claim 19, further comprising an insulation layer arranged between said magnetic yoke and said thin film coil.

21. A magnetic field generator according to claim 19, wherein said magnetic field generator is provided on a slider.

22. A magnetic field generator according to claim 19, further comprising driving means for driving said plurality of magnetic field generating elements independently.

23. A magnetic field generator for applying a magnetic field to a recording medium, said magnetic field generator comprising:

a magnetic field generator for applying magnetic fields to said magneto-optical recording medium, said magnetic field generator comprising a base surface, in which a plurality of magnetic field generating elements having thin film coils, magnetic yokes and magnetic poles are formed on said base surface independently of each other, said magnetic poles each projecting upwardly of said base surface from one end of a corresponding magnetic yoke, and said magnetic poles of said magnetic field generating elements being disposed adjacent to each other.

24. A magnetic field generator according to claim 23, wherein said magnetic field generator is provided on a slider.

25. A magnetic field generator according to claim 23, further comprising driving means for driving said plurality of magnetic field generating elements independently.

26. A magnetic field generator according to claim 23, further comprising an insulation material arranged between said thin film coil and said magnetic yoke.

* * * * *

UNITED STATES PATENT AND TRADEMARK OFFICE
CERTIFICATE OF CORRECTION

PATENT NO. : 5,485,435
DATED : January 16, 1996
INVENTOR(S) : Toru MATSUDA, et al.

It is certified that error appears in the above-indentified patent and that said Letters Patent is hereby corrected as shown below:

ON THE COVER PAGE:

In the title, item [54]

"MAN" should read --AN--;

Under "Foreign Application Priority Data," item [30]

"Mar. 20, 1990 [JP] Japan ......... 3-080647"

should read:

--Mar. 20, 1991 [JP] Japan ......... 3-080647--.

COLUMN 1:

Line 3, "MAN" should read --AN--;
Line 49, "layer 92." should read --layer 94.--;
Line 55, "250 $\mu$ m" should read --250 $\mu$m--.

Figure 2:
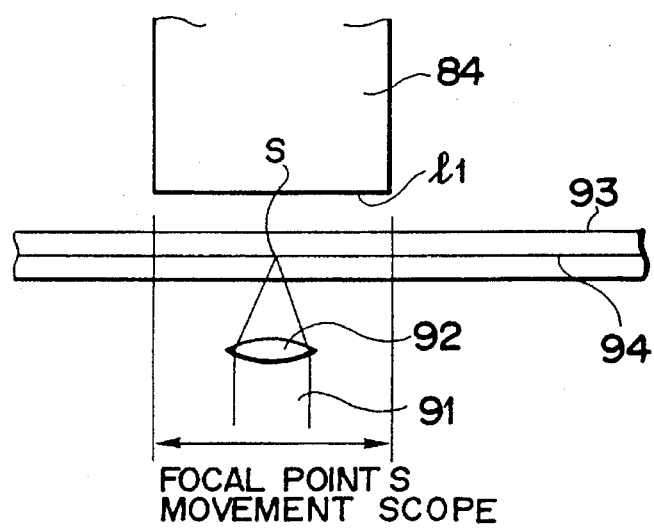
FIG. 2 is an explanatory view showing a condition of magneto-optical recording in the prior art.
Figure 3:
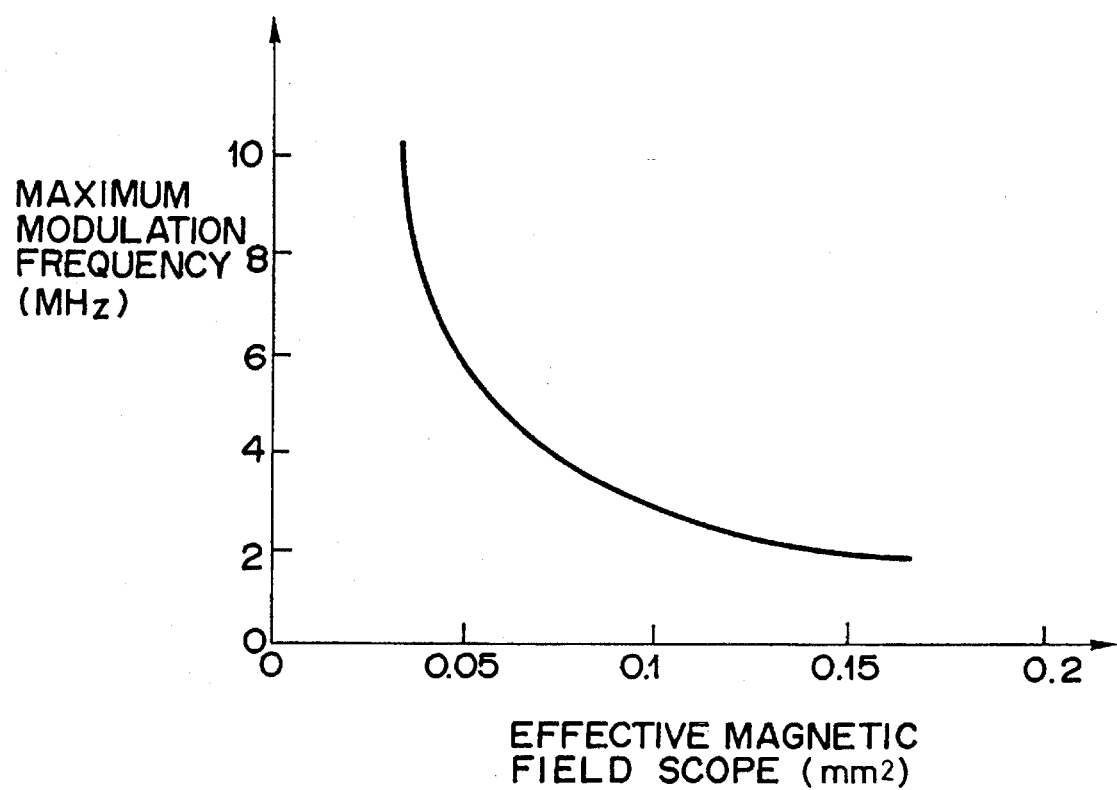
FIG. 3 is a graph showing the relationship between modulation frequency and an effective magnetic field.
Figure 4:
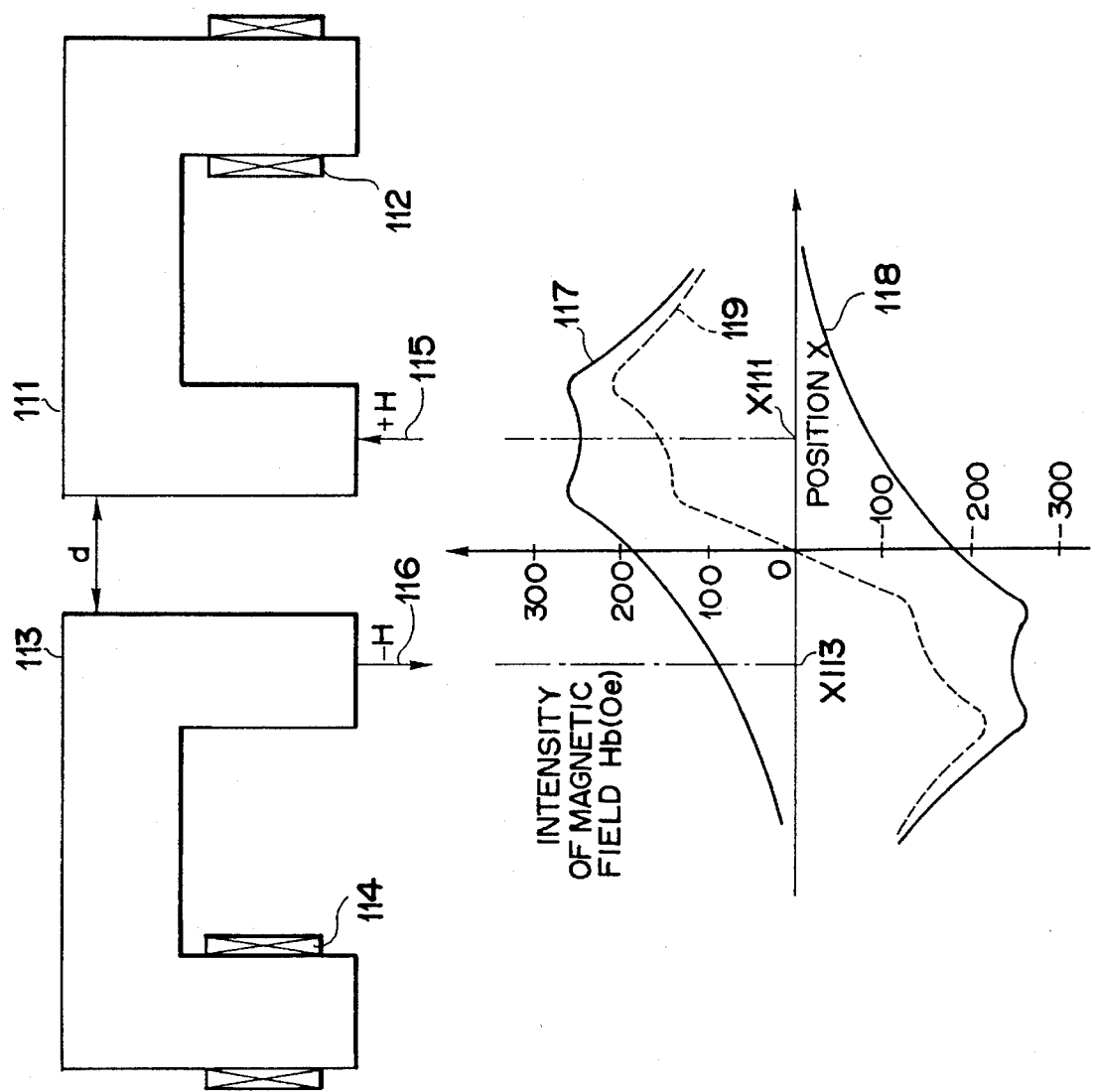
FIG. 4 is a front view showing a two-divided core in the conventional magnetic field generator along with distribution of the magnetic field generated.
Figure 5:
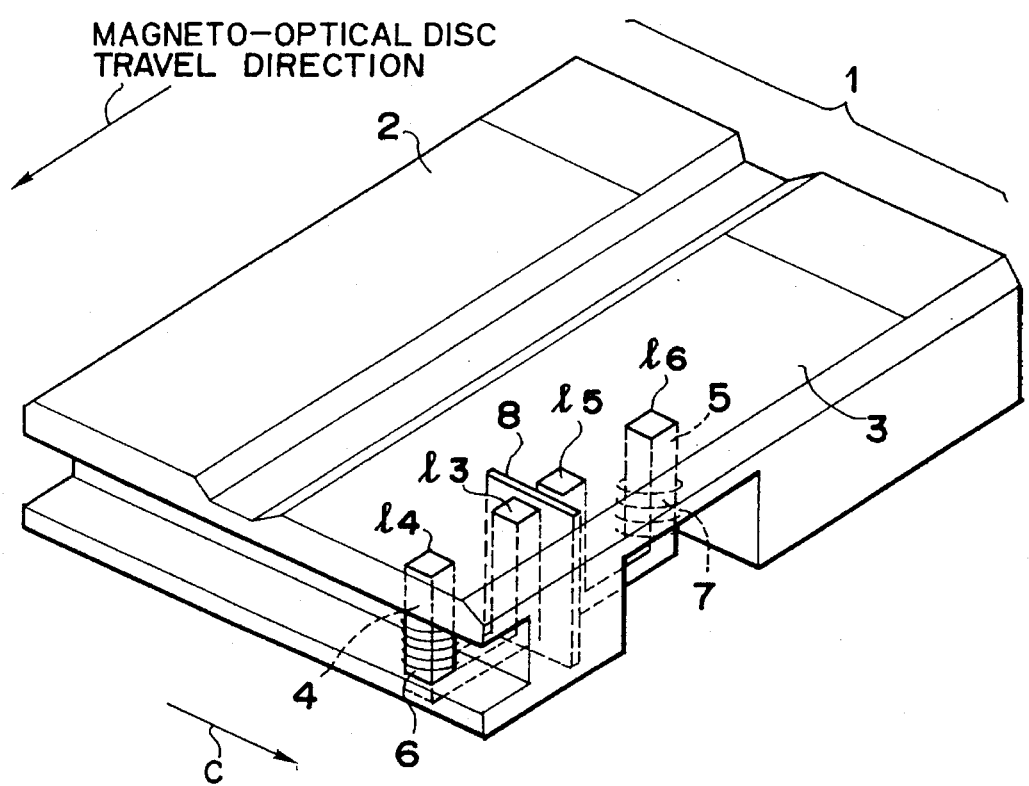
FIG. 5 is a perspective view showing one embodiment of a magnetic head for use in a magneto-optical recording apparatus of the present invention.

COLUMN 2:

Line 32, "the small-size core" should read --small-size cores--;
Line 49, "FIG. 2," should read --FIG. 4,--.

UNITED STATES PATENT AND TRADEMARK OFFICE
CERTIFICATE OF CORRECTION

PATENT NO. : 5,485,435
DATED : January 16, 1996
INVENTOR(S) : Toru MATSUDA, et al.

It is certified that error appears in the above-indentified patent and that said Letters Patent is hereby corrected as shown below:

COLUMN 3:

Line 5, "core" should read --core 111.--.

COLUMN 10:

Line 42, "Bendust." should read --Sendust.--.

COLUMN 12:

Line 6, "them" should read --them to--.

COLUMN 19:

Line 40, "cores; p1" should read --cores;-- and "a magnetic" should begin a new paragraph.

Signed and Sealed this

Twenty-fifth Day of June, 1996

Attest:

BRUCE LEHMAN

*Attesting Officer*   Commissioner of Patents and Trademarks